Feb. 8, 1966     D. G. RUSS     3,233,451
METHOD AND APPARATUS FOR MEASURING THRUST
IN JET-TYPE ENGINES
Filed Feb. 17, 1961     7 Sheets-Sheet 1
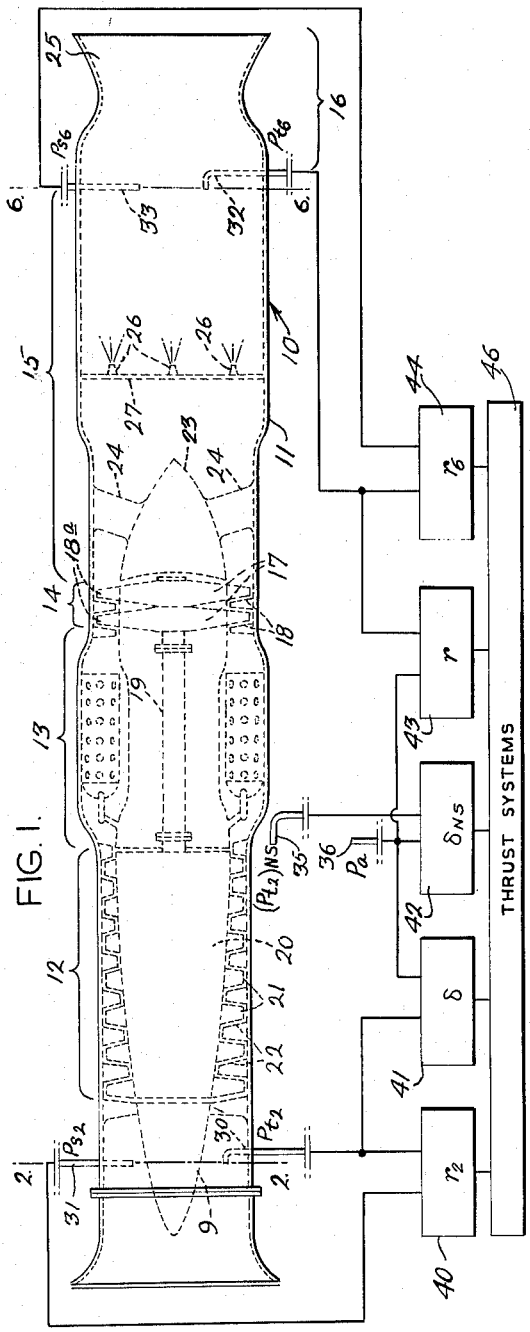
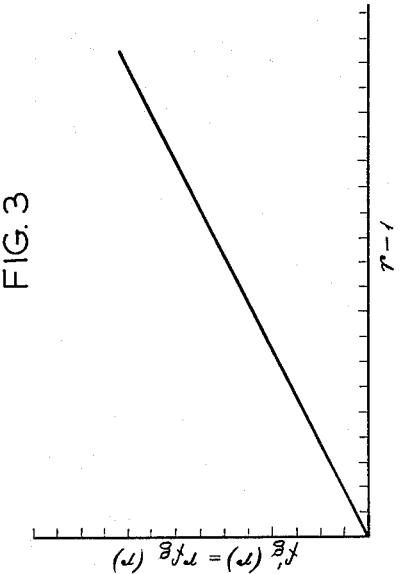
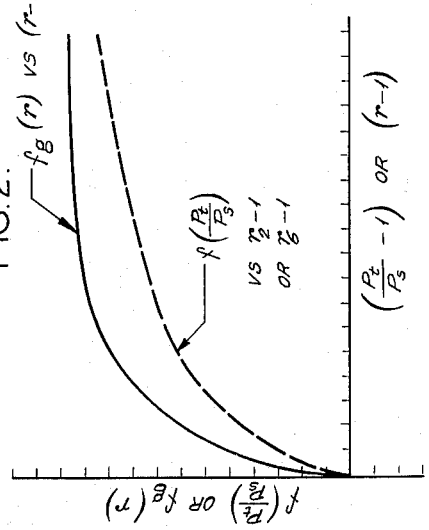
INVENTOR:
DANIEL G. RUSS
BY
Howson & Howson
ATTYS.

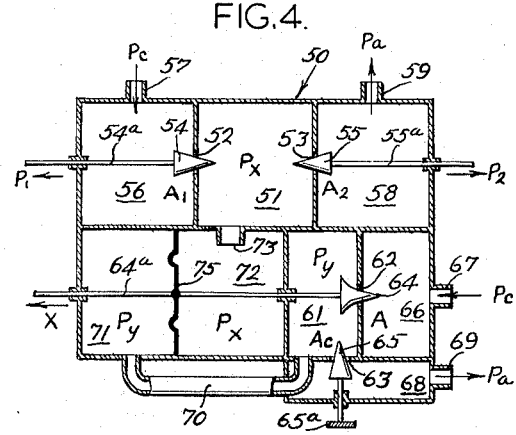

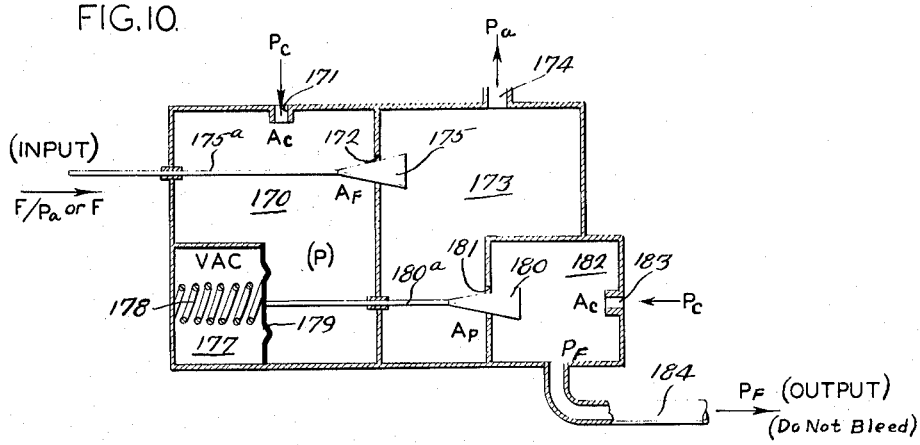
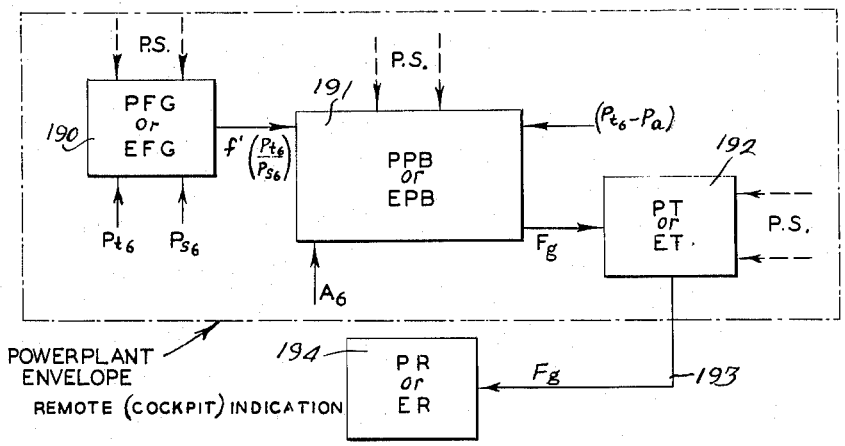
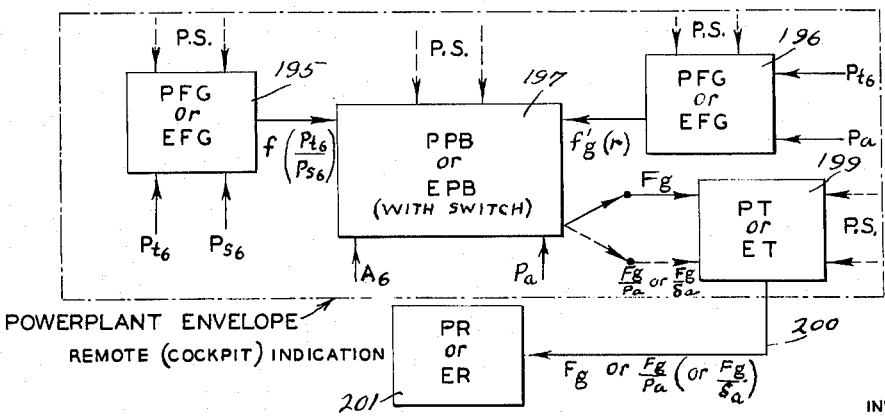

Feb. 8, 1966 D. G. RUSS 3,233,451
METHOD AND APPARATUS FOR MEASURING THRUST
IN JET-TYPE ENGINES
Filed Feb. 17, 1961 7 Sheets-Sheet 4

INVENTOR:
DANIEL G. RUSS
BY Howson & Howson
ATTYS.

Feb. 8, 1966 D. G. RUSS 3,233,451
METHOD AND APPARATUS FOR MEASURING THRUST
IN JET-TYPE ENGINES
Filed Feb. 17, 1961 7 Sheets-Sheet 5

INVENTOR:
DANIEL G. RUSS
BY
Howson & Howson
ATTYS.

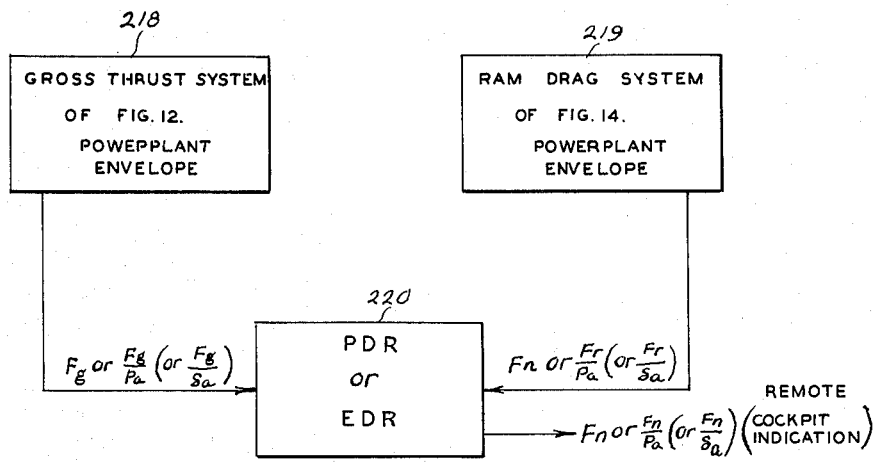
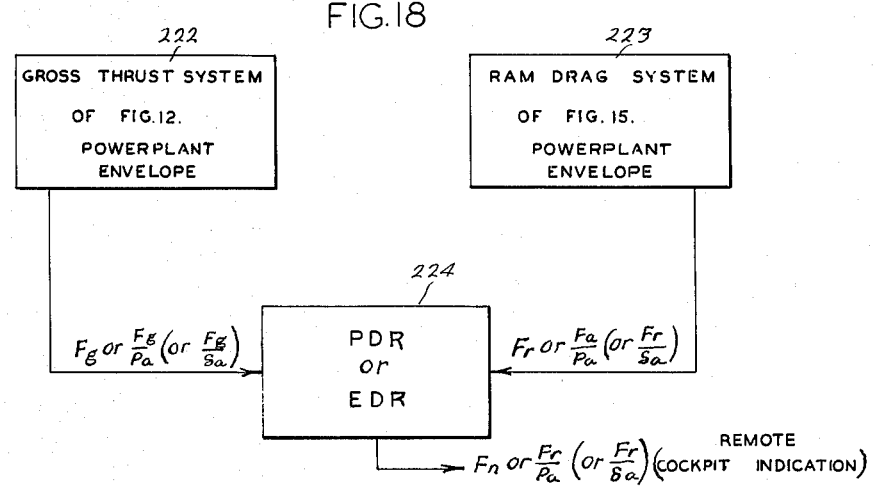
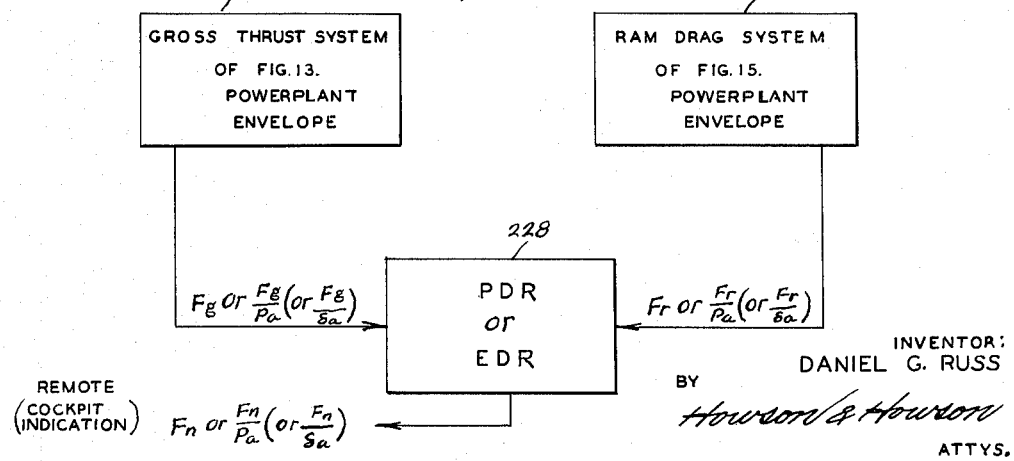

3,233,451
METHOD AND APPARATUS FOR MEASURING THRUST IN JET-TYPE ENGINES
Daniel G. Russ, 4928 Old Mill Road, Fort Wayne, Ind.
Filed Feb. 17, 1961, Ser. No. 89,959
30 Claims. (Cl. 73—116)

This invention relates to thrust measurement techniques for determining the gross and net thrust developed by jet or rocket type engines. More specifically, this invention concerns a method of measuring the gross thrust, ram drag and net thrust of jet or similar type engines installed in aircraft or other installations. It also concerns systems which function in accordance with the method and apparatus comprising the component parts of the systems.

The net thrust of an engine constitutes the force available to produce motion. The net thrust in a jet, or jet type engine, is the gross thrust produced less the ram drag of the engine. It is important to know thrust values in order to give the pilot of an aircraft, for example, complete control of his plane and engine(s) for reasons of safety and performance monitoring. He should know, for example, how much total thrust he is obtaining on take off and under other circumstances where power capabilities may be critical. In multiple-engine aircraft he needs to know the net thrust of the various engines in order to balance them and thereby prevent engine-created yaw of the aircraft. In the development or operation of jet powered installations, the ability to determine gross or net thrust of the engine(s) independently (in flight or under other operating conditions) is of major importance in establishing optimum design configurations or settings of the engine or installation components. In the supersonic flight regime of high-speed jet-powered aircraft, accurate thrust information may be more vital than in subsonic flight.

Heretofore, an accurate and convenient measurement of thrust has been extremely difficult, if not impossible to achieve. Empirical calibration has been possible, often only with elaborate test installations and after the engine is mounted and the aircraft, or other installation, completed. Calibrations normally have to be made for each installation since, even where identical engines are used on the same type of aircraft, differences exist which cause errors to accumulate. Moreover, extensive such calibrations must be provided for each installation to cover the range of conditions over which the aircraft, or other installation, may operate. Results normally have involved systems which are incapable of practical or flexible application, particularly for airborne usage and which require cross-reference to other experimental data and information to cover conditions or configurations not precisely covered by the calibrations. Furthermore, with use, the engine characteristics change, as well as other conditions affecting calibration, so that the calibrations become less and less reliable with time and usage. In fact, frequent periodic recalibration is necessary if accuracy is desired. Because of the problems recited above, as well as others, with empirical calibrations of thrust, it has become common to rely on data obtained from other indirect readings and measurements rather than relying on empirical calibration. Such estimates result in highly inaccurate and inconvenient approximations of thrust, and do not, in the present state of the art, normally take into account the effect of ram drag, the loss of thrust attributable to the engine due to air induction and ram (in flight). Commonly, indirect and limited "power parameter variables" are monitored as a means of engine protection and control rather than as real measures of thrust output. Two common such variables are engine rotor speed in turbo-jet engines and turbine temperature, and most engine control systems today affix values of these variables jointly or separately to establish output. The actual thrust output of the engine, however, depends not only on these variables but on the aircraft flight speed and altitude, the effectiveness of ram recovery, the engine performance efficiency, and several other variables not under total control. Another limited type variable, sometimes used as a rough measure of engine output, is the ratio of engine exhaust nozzle entrance pressure to engine compressor entrance pressure. This variable ignores, however, the direct effect of engine altitude and ram recovery, as well as of entrance temperature and airflow characteristics. It is an intensive aerodynamic variable depending on internal and incomplete behavior of the engine, whereas an extension totalizing variable depending also on effects beyond the confines of the engine is required insofar as thrust output is concerned. This pressure ratio, furthermore, does not detect any indication of thrust increase due to afterburning or reheat in jet-type engines. As a matter of fact, neither does the speed-temperature system described above.

At the present time, therefore, the pilot must rely, for all practical purposes, on indirect measures of thrust output and has no direct measure of thrust output to protect himself on take-offs, nor to balance engines against yaw effects in multi-engine aircraft, nor to evaluate the relative performance of his engines as the result of time and usage, nor to determine engine damage effects on output, etc. It is desirable, for all of these reasons and several others, to provide an accurate thrust meter capable of general application to jet-type powerplants in an instrument sense, i.e., capable of direct application as a primary measurement system requiring a minimum of, or no, a priori calibration and tailoring to specific engine configurations which obviate usage upon transfer from one installation to another, even when the *same* powerplant is involved. By the same token, it is desirable that such thrust meter be applicable to the gas generator section of an engine and/or to test cell installations, should such application be desired. In other words, a useful thrust system should be capable of general application in an instrument sense, for maximum practicality. To date, the difficulty of meeting such requirements has militated completely against the development of a suitable *gross* thrust meter, not to mention the more desirable, but more complex, *net* thrust meter. This situation has prevailed since the advent of common usage of jet engines, a period of at least ten years to date. The present invention provides not only practical and uniformly applicable gross and net thrust meters but also means for measuring ram drag and certain parameters which may be useful in other applications.

It is the primary object of the present invention to provide a completely new approach to the problem of thrust measurement and to provide thrust measurement systems and component apparatus possessing the desirable features specified above, and overcoming the disadvantages of current so-called "output systems" for jet-type powerplants.

Some of the primary obstacles to obtaining an accurate and practical measurement of thrust of jet-type powerplants have been the lack of a firm definition, the lack of general applicability to jet powerplants of different configurations, and the relative complexity of thrust formulas devised. These difficulties have been characteristic of the gross thrust alone. Any effort to account for the net thrust of the engine (the difference between the gross thrust and the ram drag of the engine due to air induction), includes the even greater difficulty of determining the ram drag of the powerplant. In fact, this difficulty has caused many technically interested persons to advocate the determination of gross thrust alone as a suitable measurement of jet engine output, more as a matter of convenience than propriety. The tendency has been either to ignore the problem entirely in favor of measurements of engine variables which indirectly affect the thrust output or else to utilize calibrations obtained under limited conditions of installation and operation; the best methods suggested have usually been limited in approach as a measure of output or else otherwise require a priori cailbrations covering the altitude and speed spectrum of the aircraft-engine installation. As previously suggested, such calibrations prove prohibitive economically and must be repeated for each significant variation of the engine configuration or installation and also after sufficient degeneration of engine performance is developed as a consequence of logged time and usage. Many suggested systems require otherwise such close tailoring to a specific powerplant configuration as to be totally useless even when applied to the *same* engine in another installation.

In the method of the present invention, only pressure variables are sensed and these pressures, their differences, their ratios, or function of these ratios, are employed to establish thrust values. Pressures are sensed outside as well as inside the engine for the necessary generality to be maintained. One pressure sensed outside the engine is the general ambient pressure, $P_a$, which is the general static atmospheric pressure outside the engine which can be measured almost anywhere in the aircraft system using a conventional probe. Inside the engine, pressures measured are those obtained, or representative of pressure values, at two flow cross-sections referred to herein as stations 2 and 6, respectively. Station 2 is taken at the exit section of the inlet diffuser or the entrance section of the compressor unit, hereinafter referred to as the "compressor entrance region." $P_{t2}$ is the total compressor entrance pressure and $P_{s2}$ is the static compressor entrance pressure, and both pressures are taken as to be representative of the total and static pressures at station 2. Station 6 is taken at the exit section of the tail pipe or the entrance section of the exhaust nozzle, hereinafter referred to as the "nozzle entrance" region. This section is downstream of the afterburner or reheater (if the engine uses one) or tailpipe section, whichever precedes, in a flow-sense, the exhaust nozzle, but before the exit nozzle itself. $P_{t6}$ is the total nozzle entrance pressure and $P_{s6}$ is the static nozzle entrance pressure, and again both must be measured as to be representative of the total and static pressures at station 6. Another pressure measured is $(P_{t2})_{NS}$, which is the total pressure (under conditions of normal shock at high flight speeds) measured at a location outside the engine in the surrounding airstream (if any) typical of the stagnation pressure normally obtained for airspeed or flight Mach number indication aboard an aircraft. Total pressure is the stagnation pressure (comprised of impact plus static pressure) obtained in the direction of fluid (air or gas) flow, whereas static pressure is the stream pressure measured tangential to the direction of fluid flow at the measurement station.

In the present invention, the following ratios of pressure are of significance:

$$r_2 = \frac{P_{t2}}{P_{s2}} = \text{compressor entrance flow pressure ratio}$$

$$\delta_{NS} = \frac{(P_{t2})_{NS}}{P_a} = \text{normal shock ram ratio}$$

$$\delta = \frac{P_{t2}}{P_a} = \text{ram ratio}$$

$$r_6 = \frac{P_{t6}}{P_{s6}} = \text{nozzle entrance flow pressure ratio}$$

$$r = \frac{P_{t6}}{P_a} = \text{expansion ratio}$$

In the present invention, these pressure ratios or functions of them are used to determine gross thrust, ram drag, net thrust and other thrust related quantities. The methods used in this invention are the result of my derivation of new approaches to the thrust determination problem. As the result of these new approaches I have mathematically established certain relationships of pressures or pressure ratios to thrust effects. These relationships have also been validated by experimental tests.

In order to use the method of the present invention certain systems had to be and were developed in accordance with the present invention in order to measure thrust and thrust-like effects. These systems employ novel component apparatus performing steps or substeps of the method, and, in most cases, these apparati have broader application than performance of these limited steps or substeps, as will be clear to those skilled in the art.

An understanding of the present invention can be had be reference to the accompanying drawings in which:

FIG. 1 schematically illustrates a jet-type engine and shows pressure take-off locations;

FIG. 2 is a dual chart showing how the compressor entrance and/or nozzle entrance flow functions vary with the respective flow pressure ratio $r_2$, or $r_6$ (less one), on the one hand; also how the nozzle expansion function varies with the expansion ratio $r$ (less one);

FIG. 3 is a chart showing how the expansion ratio function multiplied by the expansion ratio $r$ itself varies with the expansion ratio (less one);

FIG. 4 illustrates a pneumatic apparatus, designated as a pneumatic function generator (PFG), for generating a predetermined function of a pressure ratio;

FIG. 5 illustrates an electrical apparatus, designated as an electrical function generator (EFG), for generating a predetermined function of a pressure ratio;

FIG. 6 illustrates a pneumatic apparatus, designated as a pneumatic primary bridge (PPB), for combining certain effects, such as functions generated by the devices of FIGS. 4 and 5;

FIG. 7 illustrates an electrical apparatus, designated as an electrical primary bridge (EPB), for the same purpose as that of the pneumatic device of FIG. 6;

FIG. 8 illustrates a modified pneumatic apparatus, designated as pneumatic converter bridge (PCB), which utilizes the output of the device of FIG. 6 or FIG. 7 and converts such output to either of two signal transmitter outputs;

FIG. 9 illustrates an electrical apparatus, designated as an electrical converter bridge (ECB), for the same purpose as that of the pneumatic device of FIG. 8;

Figure 13:
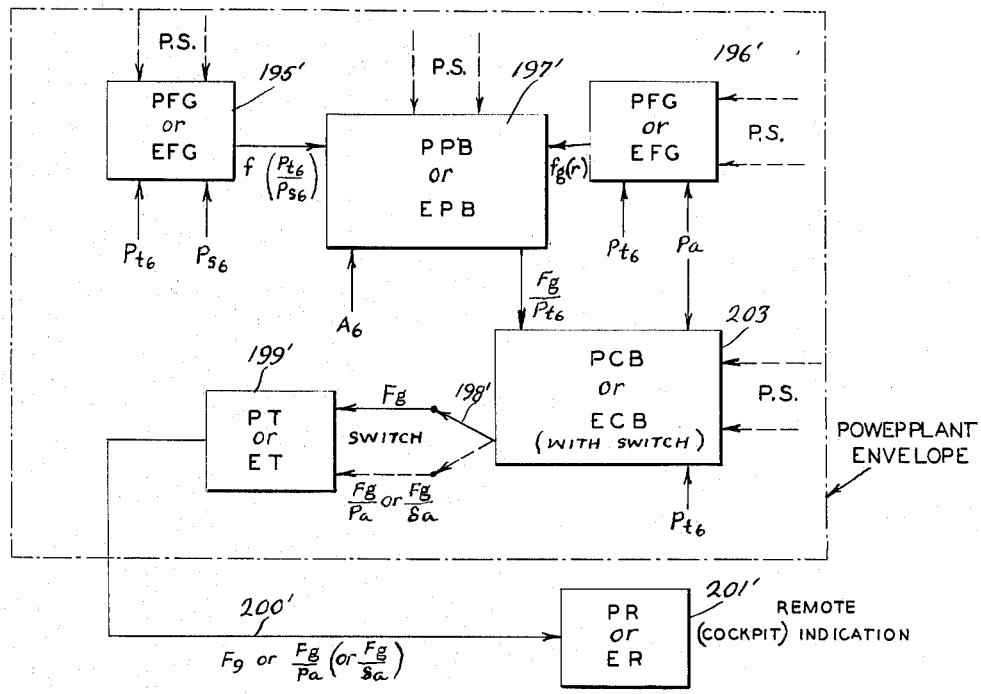
Figure 14:
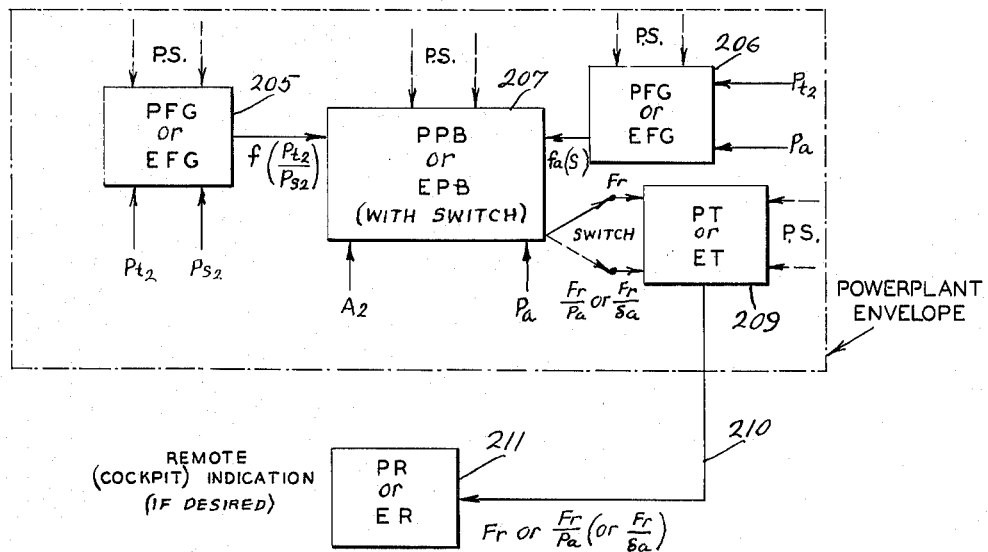
Figure 15:
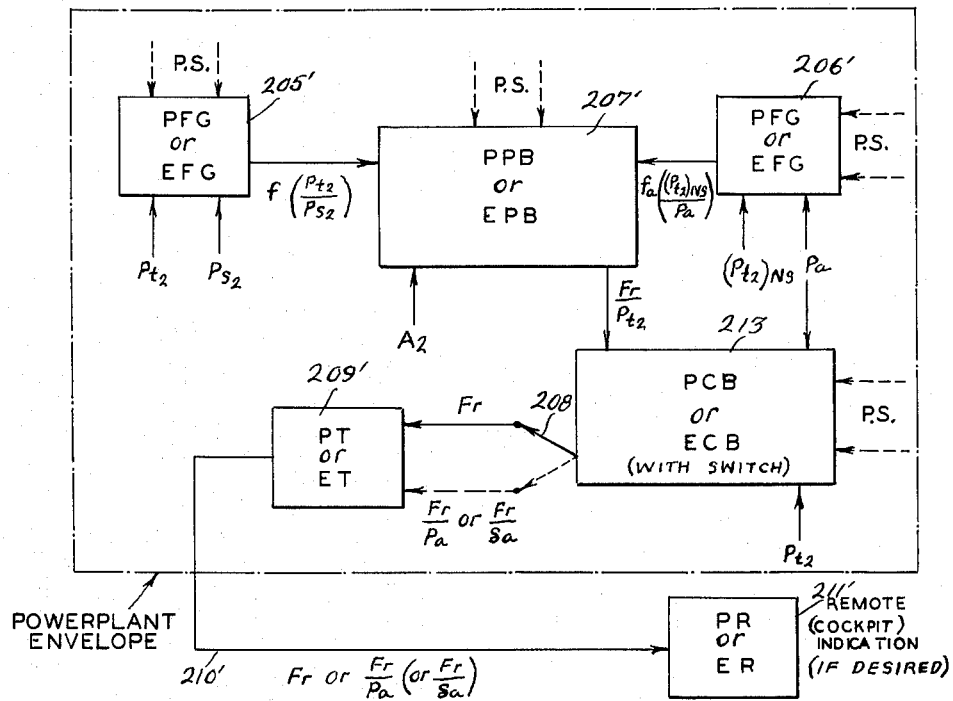
Figure 16:
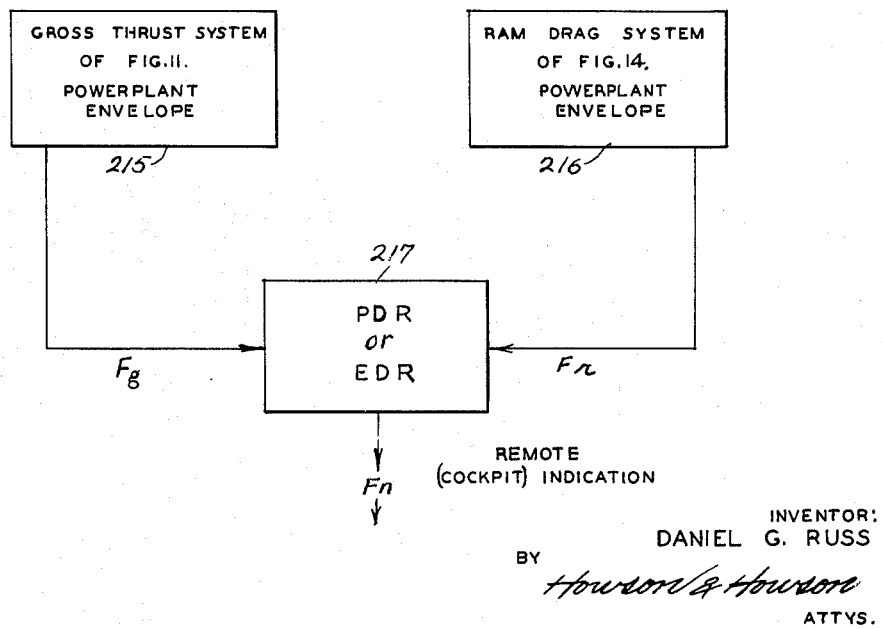
Figure 20A:
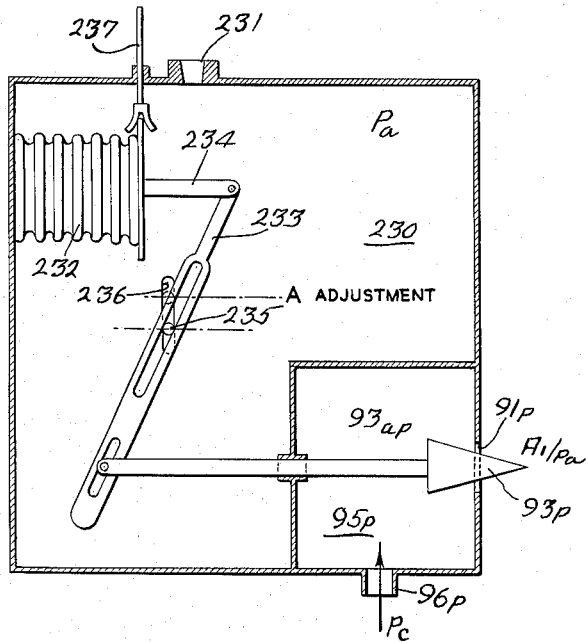
Figure 20B:
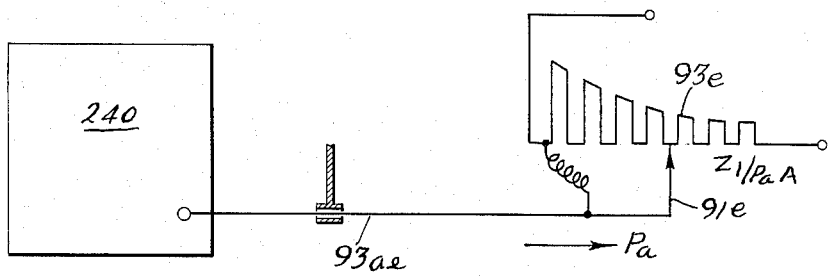

FIG. 10 illustrates a pneumatic transmitter, designated as a pneumatic transmitter (PT) for transmitting output from one of the previously described devices to a cockpit (or remote) readout instrument; an analogous electrical transmitter (ET) (not shown) would be typified by a synchro-transmitter unit. Remote readout instruments are referred to as a pneumatic receiver (PR), typified by a pressure gage, or analogously as an electrical receiver (ER), typified by a synchro-receiver; in cases where the difference of two transmitted signals is indicated, a pneumatic differential receiver (PDR) or an electrical differential receiver (EDR) is used;

FIG. 11 is a schematic block diagram showing an approximate gross thrust system using components like or similar to those described;

FIG. 12 is a block diagram showing a simplified exact gross thrust system;

FIG. 13 is a block diagram showing an exact gross thrust system using a different arrangement of components;

FIG. 14 is a block diagram showing a simplified exact ram drag measuring system for low-speed aircraft;

FIG. 15 is a block diagram showing an exact ram drag measuring system;

FIG. 16 is a block diagram showing an approximate net thrust system for low-speed aircraft;

FIG. 17 is a block diagram showing a simplified net thrust system for low-speed aircraft;

FIG. 18 is a block diagram showing a simplified (exact) net thrust system for high-speed aircraft;

FIG. 19 is a block diagram showing an exact net thrust system for high-speed aircraft;

FIG. 20a is a schematic diagram showing the region modified in a primary bridge of the type shown in FIG. 6 when a switch of the type shown in FIGS. 12 and 14 is employed; and FIG. 20b is a schematic diagram showing the region modified in a primary bridge of the type shown in FIG. 7 when a switch of the type shown in FIGS. 12 and 14 is employed.

Referring to FIG. 1, there is illustrated a jet engine including an afterburner or reheater section with suitable probes within and without the engine for obtaining the pressures required. Each of the probes is shown in its appropriate place and pressure lines are shown schematically leading to boxes representing the means for generating signals proportional to the pressures and connections are thence made to a further box representative of a general thrust system for utilizing the pressure signals as will be described in detail hereafter. It should be borne in mind that the engine shown is merely by way of example and that the present invention is applicable to engines of completely different forms having entirely different arrangement of parts and, in fact, to other types of engines such as rocket engines, with suitable modification of the systems. The showing of the engine is somewhat schematic and the showing of the thrust system derived from pressure sensing means in the engine is wholly schematic.

Referring to the gas turbine engine 10 itself within a casing 11 of general cylindrical form are arranged in axial succession an axial flow compressor 12, a combustor 13, a turbine 14, an afterburner 15 and an exhaust nozzle section 16. The elements 12, 13 and 14 are essential elements of any gas turbine engine, although their arrangement, configuration, and orientation may be quite different. The elements 15 and 16 are commonly employed and, although a converging-diverging nozzle need not be employed in all instances, some sort of tail or exhaust system to obtain desired thrust effects will be employed and will be known as the nozzle section hereafter. The axial flow compressor, for example, may be modified by employing radial or mixed flow compressor stages. It will be understood that the present invention is adaptable to any type of engine utilizing continuous entrance and/or exit fluid flows, no matter what type of compression system, what type of combustor system, or what type of expansion system, is used. In this case, the turbine 14 is composed of rotatable turbine disks 17 which are axially separated and between which are interposed fixed turbine blades 18 which are mounted from casing 11. The turbine blades 18a are supported from the turbine disks 17 which are mounted on a drive shaft 19 which may be supported in any conventional way by bearings mounted on the casing, by spiders, or other suitable structures. The drive shaft 19 supports and causes the compressor hub 20 to rotate. The nose cone 9 initially deflects the air entering the gas turbine engine into an annular stream and this annular stream flows into the compressor 12. In the compressor, there are rotor blades 21, mounted on the hub 20 and stator blades 22 intermediate the movable blades 21 and mounted from the casing 11. A tail cone 23 supported by spider 24 guides the turbine exhaust stream in a proper flow to obtain jet energy from the engine efficiently via the exhaust nozzle 25.

The afterburner is provided with jets or nozzles 26 supported upon a suitable support frame 27 which is assumed, in this illustration, to serve also as a flame holder. Any additional fuel introduced at this point adds to the thrust effect by increasing the temperature of the partially combusted gases exhausted from the turbine 14 up to stoichiometric levels.

In the operation of the engine, the air entering the engine is deflected by the nose cone 9 into an annular stream and passes into the compressor; by virute of the relative movement of the compressor blades, the air is compressed and preheated when it reaches the combustor 13. Fuel is introduced at the combustor and burns in the combustor in order to produce gases which flow through and expand to drive the turbine blades 18a, which in turn impart rotational motion to shaft 19 and hub 20, and hence to the rotor blades 21 of the compressor. As previously indicated, afterburning adds additional thrust effect.

Pressure sampling probes are introduced into the engine at two locations, one of these is along station 2, the section marked 2—2, which is referred to herein as the "compressor entrance" region and which is physically the exit section of the inlet diffuser and the entrance section of the compressor unit. Additional probes are placed at station 6, the section marked 6—6, which is the exit section of the engine tail pipe and of the afterburner, as in the illustration, the entrance section of the exhaust nozzle, which is referred to herein as the "nozzle entrance" region. Stations 2 and 6 may be selected as a matter of convenience, provided the static and total pressures to be measured are representative of (i.e., do not differ in significent degree from) the corresponding pressures existing in the compressor and nozzle entrance regions, respectively. By the same token, *provided representative station pressure values are obtained,* measuring the total and static pressures at exactly the same cross-section is not mandatory, and this invention shall not be regarded as limited thereby. The use of stations is a convenience for description and is required to affix engine size factors, as later described. In fact in certain engines usable readings might be obtained for compressor entrance pressures by locating probes in the engine stream anywhere upstream of the compressor, and the term "compressor entrance" region in reference to pressures is intended to include any such pressure readings. Similarly in certain engines, "nozzle entrance" region may be too limiting where pressure information can be obtained at other locations downstream of final burners as in ram jet or after burning turbojet engines or downstream of final turbine stages, including regions within the tailpipe, nozzle or beyond. For purposes of broad inclusion, "exhaust region" will be used to define those regions in which useful representative pressures, preferably obtainable in the nozzle entrance region, may be obtained.

In each of these regions, probes are placed so that at least one measures total and at least one measures static pressure; multiple probes may be used to minimize flow distribution problems, all the probes of each type preferably being connected in parallel to obtain an averaging effect. Instead of pure static or pure total pressure measurements, it is possible, although not preferred, to use any two independent pressures measured within a given region to the same end. However, the description herein is in terms of the preferred total and static pressure measurements. The probes measuring total pressure are arranged so that their inlet is toward and in line with the direction of the main stream of flow of gases. The static pressure probe is arranged so that its opening is tangential to the main stream of flow of the gases. The entrance to the total pressure sampling probe is generally placed at or near the same flow section or station so that it experiences the same pressure conditions as the static probe, although, as mentioned above, the only requirement in this regard is the measurement of representative station values. Thus probe 30 measures the total pressure at station 2, whereas probe 31 measures the static pressure at station 2. Probe 32 measures the total pressure at station 6 and probe 33 measures the static pressure at station 6. A probe outside of the engine in the airstream measures the normal shock total pressure $(P_{t2})_{NS}$, as by probe 35. Probe 36 measures the static atmospheric or ambient pressure $P_a$ outside the engine. The pressures measured are shown in FIG. 1 on the lines which connect them to pressure responsive means in ratio function generators or other means utilizing these pressures, as described below. Shown here are the function generators 40, 41, 42, 43 and 44 which produce, respectively, the entrance flow pressure ratio, the ram ratio, the normal shock ram ratio, the expansion ratio and the exit flow pressure ratio. In a schematic sense, output connection of various types, as will be discussed hereinafter, lead from these devices into various thrust systems, generally designated by block 46.

It will be understood that, although the location shown for probes are those preferred and most useful in accordance with the present invention, in the most general approach to the present invention, pressures may be sampled at other different locations within the engine to obtain different or additional information and this information may be treated in accordance with the techniques discussed hereafter.

The use of probes as such within the engine is not new. For example, see my application, Serial No. 644,530, filed March 7, 1957, and my Patent No. 2,441,977, and those of A. S. Atkinson, Nos. 2,441,948 and 2,711,073. The techniques of use of probes may be considered well known from the teachings of these references and, accordingly, will not be considered in detail herein.

The method of the present invention is dependent upon certain general thrust equations which I have derived mathematically and which have been validated by test. The first of these equations is the gross thrust equation which may be stated as follows:

$$\frac{F_g}{P_a} = A_6(r) f_g(r) f(r_6) \qquad (1)$$

wherein $F_g$ is the gross thrust, $P_a$ is the ambient pressure, $A_6$ is the size factor in the exhaust region just prior to the discharge nozzle, $r$ is the expansion ratio, $r_6$ is the nozzle entrance flow pressure ratio, $f_g(r)$ is a predeterminate function of the expansion ratio, and $f(r_6)$ is a predeterminate function of the nozzle entrance flow pressure ratio, as illustrated in FIG. 2. For a given engine, $A_6$ is a constant so that the only variable quantities on the right-hand side of the equation are the ratios $r$ and $r_6$. The functions $f_g(r)$ and $f(r_6)$ are entirely predictable and may be plotted against the particular pressure ratio involved, as in FIG. 2.

It is possible to substitute a new function of a particular ratio for the product of that ratio and a function of the ratio. Thus by definition, let:

$$f_g'(r) = r f_g(r) \qquad (2)$$

The function $f_g(r)$ is illustrated in FIG. 3 and is a nearly linear function of the expansion ratio $r$, particularly at the higher values of $r$, the more usual operating range of jet-type engines. To an acceptable degree of approximation depending upon the range of pressure ratios involved, the function $f_g'(r)$ may, therefore, be regarded a linear function such that $$f_g'(r) = K_g(r-1) \qquad (3)$$

where $K_g$ defines the constant of proportionality. Substituting the last two equations into the first equation, the following approximate equation is obtained:

$$\frac{F_g}{A_6(P_{t6} - P_a)} = K_g f(r_6) = f'(r_6) \qquad (4)$$

were $f' = K_g f$ is a modified nozzle entrance flow function of $r_6$. Equation 4 may be employed to obtain approximate values of gross thrust with less apparatus than is required to obtain gross thrust more accurately using Equation 1.

The ram drag is defined analogously to the first equation by the following equation:

$$\frac{F_r}{P_a} = A_2(\delta) f_a(\delta_{NS}) f(r_2) \qquad (5)$$

wherein $F_r$ is the ram drag, $P_a$ is the ambient pressure, $A_2$ is the size factor at the compressor entrance station, $f_a$ a predeterminate function of the normal shock pressure ratio $\delta_{NS}$ (similar in appearance to $f_g(r)$ of FIG. 2, and $f(r_2)$ is a predeterminate function of the compressor entrance flow pressure ratio $r_2$ (similar to $f(r_6)$, FIG. 2).

It will be observed, therefore, that the Equation 5, defining ram drag, is not only analogous to Equation 1, defining gross thrust, but its corresponding functions are likewise similar, except for the effects of differing specific heat ratios applicable to hot exhaust gases in distinction to relatively cold entrance air. In addition, the variables probed and the pressure ratio ranges differ, being generally lesser at the ram side of the engine. Except for rangeability, variables used, and ranges of pressure ratios involved, the computer structure for the gross thrust system, per Equation 1, can, therefore, agree with that for the ram drag system, per Equation 5. For aircraft flying at Mach numbers generally less than 1.3, $$\delta = \frac{P_{t2}}{P_{a5}} \approx \frac{(P_{t2})_{NS}}{P_a} = \delta_{ns} \qquad (6)$$

and Equation 5 will reduce to a function of only two independent pressure ratios, possibly also approximating $(\delta f_a) = f_a'(\delta)$ as a linear function, analogously to $f_g'(r)$ in Equation 3 above. Consequently, for low-speed aircraft, the ram drag unit will be capable of simplification along lines similar to the gross thrust unit in its simpler version:

$$\frac{F_r}{A_2(P_{t2} - P_a)} = K_a f(r_2) = f'(r_2) \qquad (7)$$

where $f' = K_a f$ is a modified compressor entrance flow function of $(r_2)$.

One of the fundamental modules required by the above equations is a non-linear pressure ratio function generator. Such a generator can be designed to produce the functions $f_g$, $f$, $f'_g$ and $f_a$ as typical functions of this type. A general expression for such a function may be written $$F\left(\frac{P_1}{P_2}\right) \qquad (8)$$

where $P_1$ and $P_2$ generally represent the two pressures involved in the pressure ratio of interest.

Beginning with FIG. 4, structures are shown for employing pressures to obtain some output which reflects a function which varies in some respect as some quantity employing pressure. In accordance with the present invention it is possible to build structures which accomplish the operations required by the thrust equations. For example, it is possible to build components which produce outputs representing some function of a pressure ratio. It is possible to build components which take pressure ratios, functions of pressure ratios, or other quantities and combine them to produce desired intermediate outputs. The discussion hereinafter will be in terms of modular elements or components first shown in detail and then shown as blocks arranged to form thrust measurement systems of various types. Most of the component apparatus of the present invention is of the null bridge or self-balancing bridge type. Devices of this kind are known (see my copeding application Serial No. 644,530) so that detailed discussion of them herein is unnecessary. For maximum ease of comprehension, structures showing pneumatic and electrical variations of modular elements or components will be first developed in FIGS. 4–10, after which block diagrams comprising various combinations of these modular elements or components to effect total systems will be illustrated to cover the field of invention broadly.

FIG. 4 illustrates a pneumatic self-nulling bridge generating a displacement X proportional to a non-linear function F of a pressure ratio, in accordance with expression 8, whereas FIG. 5 illustrates an electrical bridge of the same type. In FIG. 4, the function generator structure consists of a housing or pneumatic enclosure generally designated 50 which is subdivided into compartments as will be described. In one compartment 51 a pressure $P_x$ is developed which depends upon the rate at which air under supply pressure $P_c$ is able to enter the chamber through orifice 52 and air under the pressure $P_x$ within chamber 51 is able to exhaust through orifice 53 to a pressure $P_a$. Restricting the orifice 52 is a plug 54 whose position can be axially varied to change the relative effective size of the orifice 52. Since the position of the plug 54 is varied in response to an effect proportional to any first pressure $P_1$ operating through the shaft 54a it may be said that the position of the plug 54 and hence the effective size of the orifice 52 depends upon and varies with the pressure $P_1$. Similarly plug 55 partially restricts the orifice 53 and changes its effective size depending upon its position which may vary through its supporting shaft 55a in response to a force or effect proportional to any second pressure $P_2$. The supply pressure $P_c$ is fed into a chamber 56 in advance of the orifice 52 through a coupling or connection 57 from a suitable supply line. Similarly chamber 58 adjacent the orifice 53 is in communication with the ambient exhaust pressure $P_a$ through an opening 59. The pressure $P_c$ is normally greater than $P_a$; their values otherwise are not significant. $P_c$ herein represents a common supply pressure available as a standard so that $P_c$ is equal in all places at any given time. Preferably it is obtained from a compressor aboard the aircraft supply air pressure for other purposes.

Also within the housing 50 is a compartment 61 for developing a balance pressure $P_y$. The supply pressure $P_c$ enters this compartment through an orifice 62 and the compartment 61 is vented to ambient pressure $P_a$ through an orifice 63. As in the previous case the orifice 62 is partially closed by the plug 64 whose position varies the effective opening of orifice 62 and similarly the effective area of orifice 63 is varied by the position of plug 65. The supply pressure $P_c$ is fed from the supply line through connection 67 to compartment 66. Compartment 68 is kept at ambient pressure $P_a$ by virtue of open vent 69. In this case, however, the plug 65 is adjusted by means of shaft 65a into a fixed position in which the plug fixes a constant effective flow area $A_c$. Plug 64 on the other hand is connected by shaft 64a to an arrangement which causes its position and hence the effective area of orifice 62 to be dependent upon the ratio of pressures $P_x$ and $P_y$ in the system. This results from the connection of the chamber 61 containing the pressure $P_y$, through a by-pass line 70 to a chamber 71. Chamber 51 containing pressure $P_x$ is connected to chamber 72 through vent 73. Consequently opposed pressures $P_y$ and $P_x$ exist on opposite sides of the common wall between chambers 71 and 72 and in the wall is a portion 75, preferably a flexible diaphragm which is movable in response to any differences in the pressures $P_v$ and $P_y$. The control or supporting shaft 64a for plug 64 is mounted in this wall portion 75 and moves with the wall as it attempts to equalize pressures on opposite sides of the diaphragm 75.

The plug 64 is provided with a suitable contour form such that its movement by flexible wall portion 75 causes orifice 62 to assume the proper effective area according to its appropriate relationship of r to f(r), or other appropriate pressure ratio as determined from its characteristic, e.g., FIG. 2. Therefore, the position of the shaft 64a may be taken to represent the output of the device or the value of the function generated and it may extend outside of the housing 50 for coupling it to another part of the system or for use as a readout means. For instance, the shaft 64a may be provided with a pointer cooperating with a fixed scale directly calibrated to give the value of the function for each value of the pressure ratio or it may be applied as an input to another unit or used to operate by a suitable transducer to convert it to a signal useful for this purpose.

In FIG. 4, the area $A_1$ (effective area of orifice 52) is varied directly as the pressure $P_1$, using a suitable drive (not shown), such as a bellows, spring-loaded diaphragm, or equivalent mechanism responsive to the pressure $P_1$. Similarly, $A_2$ (effective area of orifice 53) varies directly with $P_2$. The bridge is fed from a supply pressure source to provide a common reference pressure $P_c$ as, for example, and exhausts overboard to some lower pressure, preferably the ambient pressure $P_a$. It is only necessary that $P_c$ be greater than $P_a$. The actual values or their constancy are unimportant since they are applied to both sides of the bridge and the bridge is null-balanced and works with either sonic or subsonic bleeds. These same pressures provide the same pressure differential across the parallel pressure system in which the specially contoured plug 64 varies effective area A non-linearly in series with effective constant area $A_c$, which although adjustable for sensitivity and stroke control, is maintained fixed in operation. When the bridge is nulled, $P_x=P_y$, and $A/A_c=A_1/A_2$. Therefore, it may be said that $$A = A_c\left(\frac{A_1}{A_2}\right)$$

Since this means that effective area A is proportional to $$\left(\frac{A_1}{A_2}\right)$$

the displacement X, which is a function of A, must be a function of $$\left(\frac{A_1}{A_2}\right)$$

and therefore a function of $$\left(\frac{P_1}{P_2}\right)$$

When the bridge is nulled therefore, and plug 64 suitably contoured, the output X is proportional to the function $$F\left(\frac{P_1}{P_2}\right)$$

as required.

If desired, the element driven through the displacement X can be non-linearized such that A is linear, or only partly non-linear, in order to spread severe non-linearities of the function F over two elements. The stem 64a of plug 64 can drive either another area in a pneumatic bridge, an impedance of an electrical bridge, or any mechanistic equivalent, as required in the main thrust computer bridge to be described later.

FIG. 5 shows an electrical function generator analogous to the pneumatic function generator of FIG. 4 and wherein the members corresponding to those in FIG. 4 bear the same numbers with the addition of primes thereto. In the electrical system of FIG. 5, a voltage differential power supply is provided by the supply lines 57' and 59' instead of a pressure differential. The impedances 54' and 55' are placed in adjacent arms of the bridge. In the embodiment shown, taps 52' and 53' are connected by flexible leads to the common connection point between the two impedances so that a portion of each impedance may be shorted out in selecting the values of $Z_1$ and $Z_2$. These taps 52' and 53' are varied respectively by positioning means responding to means similar to those effective in the embodiment of FIG. 4 responsive to pressures $P_1$ and $P_2$, respectively, so that the position of the taps and the values of $Z_1$ and $Z_2$ may be said to be proportional to the pressures $P_1$ and $P_2$, respectively. The common connection between impedances 54' and 55' is, in turn, connected to one side of the servo motor 75'. In the other arms of the bridge are impedances 65' and 64' of which impedance 64' may be non-linear in the same way and for the same purpose that plug 64 is non-linear in FIG. 4. Taps 62' and 63' are provided to short out part of the impedances 64' and 65', respectively, and hence produce the effective impedances Z and $Z_c$, respectively. Tap 63' is pre-adjusted in a fixed position, but tap 62' is moved by a rack 78 responding to a worm gear 77 on the shaft of the servo motor 75'. Servo motor 75' is driven by a power supply 76 and, as previously mentioned, is connected at one side to the common connection between impedances 54' and 55'. At its other side, it is connected between impedances 64' and 65'. The servo motor system is so arranged that any differential voltage developed across these side connections will drive impedance Z tap 62' as to nullify such voltage.

When the taps 52' and 53' are positioned responsive to pressures $P_1$ and $P_2$ any unbalance of voltage in the bridge developed across the servo motor due to any change of either pressure value causes the servo motor 75' to drive in such direction as to move the tap 62' through rack 78 in such direction as to restore the balance of the bridge i.e., nullify the unbalance voltage. The resulting position of the rack or member 78a attached to the rack establishes a displacement X which is the output of the bridge and which may be used in precisely the same way that the output X of the pneumatic bridge in FIG. 4 is employed. When the bridge is nulled, $Z/Z_c = Z_1/Z_2$, or $$Z = Z_c \frac{Z_1}{Z_2}$$

Since $Z_c$ is a constant, Z is proportional to $Z_1/Z_2$. Therefore the displacement X, which is a function of Z must be a function of $Z_1/Z_2$ and therefore a function of $P_1/P_2$. When the bridge is balanced by the sulf-nulling servo system, as shown, with suitable contouring of the "electro-cam" impedance 64' (i.e., Z), the displacement X is proportional to $$F\left(\frac{P_1}{P_2}\right)$$

as in the pneumatic function generator bridge of FIG. 4. Here again, if desired, the non-linearity can be spread as desired between impedance 64' and the drive means for tap element 62' driven through the displacement X. The electrical bridge may be fed by either an A.C. or D.C. voltage supply.

For purposes of simplicity of description the mechanism of FIG. 4 will be called pneumatic function generator and designated PFG. The equivalent electrical counterpart in FIG. 5 will be called an electrical function generator and designated EFG. Other types of function generators utilizing mechanical equivalents, etc., and based correspondingly on the self-nulling bridge techniques described above will be understood by persons skilled in the art to be the equivalent of those described.

The function generators described, or within the scope of this invention, can be utilized to drive various elements in what will be designated a primary bridge. The symbols PPB and EPB will be used to denote a pneumatic and an electrical primary bridge, respectively. The primary bridge is used basically to solve an equation of the form $$\frac{F}{P} \cdot \frac{1}{A} = \psi_2(R_2)\psi_3(R_3) \qquad (9)$$

where $F$ = generally thrust (ram or gross),
$P$ = a bias pressure, or pressure difference,
$\psi_2$ = one function of a pressure ratio $R_2$, and
$\psi_3$ = another function of a separate pressure ratio $R_3$.

All of the significant thrust equations described above may be put into this general form of equation. Thus, the factor $r$ of Equation 1 is equal to $(P_{t6}/P_a)$, so that $$\frac{F_g}{P_a r} = \frac{F_g}{P_{t6}} = A_6 f_g(r) f(r_6) \qquad (10)$$

and therefore $$\frac{F_g}{P_{t6}} \cdot \frac{1}{A_6} = f_g(r) f(r_6) \qquad (11)$$

this being of the form of Equation 9 above wherein $F = F_g$
$P = P_{t6}$
$A = A_6$
$\psi_2 = f_g$ and $\psi_3 = f$ Equation 4, which determines the approximate value of $F_g$ is already in the form of Equation 9 wherein $F = F_g$
$P = (P_{t6} - P_a)$
$A = A_6$
$\psi_2 = K_g$ and $\psi_3 = f$ Similarly, Equation 5, which defines the ram drag, can be put into the form of Equation 6 by replacing $\delta$ by its equal, $P_{t2}/P_a$, so that $$\frac{F_r}{P_a \delta} = \frac{F_r}{P_{t2}} = A_2 f_a(\delta_{NS}) f(r_2) \qquad (12)$$

$$\frac{F_r}{P_{t2}} \cdot \frac{1}{A_2} = f_a(\delta_{NS}) f(r_2) \qquad (13)$$

which is of the form of Equation 9 wherein $F = F_r$
$P = P_{t2}$
$A = A_2$
$\psi_2 = f_a$
$\psi_3 = f$ FIGS. 6 and 7 show, respectively, means of solving the basic Equation 9 in a PPB or EPB using PFG's or EFG's, or their equivalents, to generate the functions $\psi_2$ and $\psi_3$. It will be apparent to those skilled in the art that EFG units can also drive the function element of PPB, and PFG units can also drive the friction element of an EPB equally well, whenever these become advantageous arrangements in any specific application. This, of course, suggests various combinations of all sorts of possible component units or modules with other components or modules of other types. For purposes of illustration and supporting structure, FIG. 6 assumes use of the PPB with PFG elements and FIG. 7 the use of the EPB with EFG elements, it being understood that the invention is not thereby limited.

A pneumatic example of the primary bridge is shown in FIG. 6 wherein a chamber 80 containing pressure $P_x'$ is provided with an inlet orifice 81, an outlet orifice 82, the effective areas $a_1$ and $a_2$ of each of which may be varied by the plugs 83 and 84, respectively, which extend therethrough by moving the plugs into and out of the orifice by moving their respective shafts 83a and 84a axially. Shaft 83a is arranged to be moved axially by a displacement X proportional to the function of $\psi_2$ developed from a PFG device similar to that of FIG. 4, or equivalent. The energy for operating the primary bridge, for example, comes from a compressor which supplies air at pressure $P_c$ through coupling 86 to chamber 85 adjacent orifice 81. Chamber 80 exhausts through orifice 82 to a chamber 87 which is vented to the ambient pressure $P_a$ through an opening 88. A line 89 conveys the intermediate pressure $P_x'$ to servo valve 102 to be described.

A similar pneumatic cylinder 90 contains pressure $P_y'$ which is determined by the effective areas of orifices 91 and 92 which are varied by plugs 93 and 94, respectively. Again, these plugs are controlled by axial movements of their supporting shafts 93a and 94a, respectively, and, in this case, shaft 93a is moved in accordance with a pre-set size factor A whereas shaft 94a is moved in accordance with the function $\psi_3$. The size factor plug 93 may be set by a manually adjusted rack and pinion system 108 arranged a suitable size factor scale 109. A chamber 95 adjacent to orifice 91 is provided with a suitable coupling 96 to the compressor supply so that it receives air at pressure $P_c$. A compartment 97 adjacent the orifice 92 is vented to the ambient pressure $P_a$ through opening 98. The line 99 connects chamber 90 with the servo valve 102 and hence supplies pressure $P_y'$ thereto.

The effective area of orifice 82 is controlled by the location of plug 84 which depends for its position on the position of a piston 101 to which the plug's shaft 84a is attached in a cylinder 100. Cylinder 100 has fluid connections to the servo valve 102. The servo valve is a spool type valve having a spool cylinder 103 which is moved out of neutral position by any unbalance between pressures $P_x'$ and $P_y'$ applied at the opposite ends of the spool through the conduits 89 and 99, respectively. When unbalance occurs, fluid is fed to one side of the piston 101 or the other through either the conduit 104 or 105 and exhausted through the other conduit. Pressure $P_c$ is supplied through supply line 106 which supplies pressure when exhaust is permitted through lines 107 to the ambient pressure $P_a$. The pressures used in the servo valve need not be the same as those used in the other compartments of the primary bridge but will normally be so as a matter of convenience.

Here the effective area of orifice 81 is $a_1$. The effective area of orifice 82 is $a_2$. The effective area of orifice 91 is $a_1'$ and the effective area of orifice 92 is $a_2'$. When the bridge is nulled, $a_2/a_1 = a_2'/a_1'$. Assume $a_1$ is set proportional to $\psi_2$ and $a_2'$ is set proportional to $\psi_3$; if the area $a'$ is made proportional to $(1/A)$, then $a_2 = (a_1 a_2'/a_1')$ is proportional to $A\psi_2\psi_3$ and, therefore, to $F/P$ in the sense of Equation 9. Therefore, the null position of the piston 101 in control cylinder 100 or of plug 84 or shaft 84a is a function of $(F/P)$. The arrangement is such that adjustment of plug 84 will tend to bring pressures $P_x'$ and $P_y'$ back into balance. The application of the formula has already been described and should be obvious.

FIG. 7 is the electrical equivalent of the pneumatic bridge of FIG. 6 and corresponding parts are designated by corresponding numbers, with primes attached. The impedances 83' and 84' are connected in adjacent legs of the bridge and have part of their impedance shorted out by taps 81' and 82', respectively. The remaining impedances $z_1$ and $z_2$ are proportional to the function $\psi_2$ and (when the bridge is nulled) to the ratio $F/P$, respectively. Bridge voltage is supplied across adjacent impedances through supply lines 86' and 88'. Similarly bridge voltage power is supplied across adjacent impedances 93' and 94', part of which is shorted out by taps 91' and 92' to provide resultant impedances $z_1'$ and $z_2'$. $z_1'$ is set manually to be proportional to $(1/A)$ where A is the size factor by means of tap 91' and scale 109' and $z_2'$ is set proportional to $\psi_3$ by means of a suitable EFG or equivalent. A servo motor 102' is placed across the bridge between the impedances $z_1$ and $z_2$, and between $z_1'$ and $z_2'$. When connected to a power source 110 and the bridge is unbalanced, the servo motor drives a worm 100' which moves a rack 101' to change the position of the tap 82 in the proper direction until balance is regained. When the bridge is balanced, $z_2/z_1 = z_2'/z_1'$. If $z_1$ is proportional to $\psi_2$, $z_2'$ is proportional to $\psi_3$, and $z_1'$ to $(1/A)$, then $z_2$ is proportional to $A\psi_2\psi_3$ and, therefore, to the ratio $F/P$, in accordance with Equation 9, whenever the bridge is in balance.

The output from the primary bridge requires conversion to produce the desired outputs $F_g/P_a$, $F_r/P_a$, $F_g$, and $F_r$. These conversions may be accomplished by typical apparatus which are described more fully below as pneumatic and electrical conversion bridges, herein designated as PCB and ECB, respectively, and shown in FIGS. 8 and 9. It will be seen that these bridges are similar to the primary bridges and function generators in that automatic null-type systems are again used and the construction is otherwise similar, except that switches are used to convert the indication from the aerodynamic quantities $F_g/P_a$ and $F_r/P_a$ to $F_g$ and $F_r$, respectively, dependent on pilot demand. Although these conversion bridges complicate the structure, high speed aircraft will require this additional type bridge to measure ram drag accurately in accordance with Equation 5 above.

It should be noted, however, that for subsonic, and slightly supersonic, aircraft, it is possible to obtain directly from the primary bridge the required aerodynamic gross thrust $F_g/P_a$ and the aerodynamic ram drag $F_r/P_a$ and thereby avoid the necessity of the converter bridges to be described. Thus, combining Equations 1 and 2 and rearranging, it is seen that $$\frac{F_g}{P_a} \cdot \frac{1}{A_6} = f_g'(r) f(r_6) \quad (14)$$

which is of the form of Equation 9 and exactly defines $F_g/P_a$; consequently, it is possible to compute $F_g/P_a$ correctly utilizing a PPB or an EPB, or equivalent.

In a similar fashion, for aircraft operating below a Mach number of about 1.3 and providing the ram system does not create a heavy aerodynamic shock system through inefficiency, the pressure ratio $$\delta_{NS} = \frac{(P_{t2})NS}{P_a} \approx \delta \quad (15)$$

so that $$\delta f_a(\delta_{NS}) \approx f_a'(\delta) \quad (16)$$

by definition. Combining Equation 5 with Equation 16 and rearranging, $$\frac{F_r}{P_a} \cdot \frac{1}{A_2} = f_a'(\delta) f(r_2) \quad (17)$$

which is also of the form of Equation 9 and therefore $F_r/P_a$ is determinable from a PPB or EPB unit, or equivalent, for low-speed aircraft.

It should be noted that whereas Equation 14 is always correct, Equation 17 will be so only when flight is subsonic, or nearly so. From the standpoint of simplicity and where possible, Equations 14 and 17 should be directly determined in a primary bridge, rather than utilizing a primary bridge followed by a converter bridge (described below), which becomes necessary only for ram drag computation under high speed flight conditions, or say, generally, when Equation 15 becomes sufficiently invalid. For purposes of description and later composition of various thrust systems and their coverage herein, systems utilizing the computations in accordance with Equations 14 and 17 will be referred to as simplified thrust systems. In such application, the switch systems disclosed herein below to convert to absolute values of gross thrust $F_g$ and ram drag $F_r$ would be appended to the primary bridge instead of to the converter bridge, as shown, whenever the simplified thrust systems are involved. The converter bridge, however, may be a requirement for at least the ram drag system and will, therefore, be described.

Generally speaking, the converter bridge shall be construed to be apparatus which, in the context of this disclosure, performs the operation $$\frac{F}{P} \cdot \frac{P}{P_a} = \frac{F}{P_a} \quad (18a)$$

or alternatively, upon application of the inherent switch mechanism, performs the operation $$\frac{F}{P} \cdot P = F \quad (18b)$$

In these equations, F is thrust generally (gross, ram, or net), P is input bias pressure, such as $P_{t6}$ or $P_{t2}$, and $P_a$ is output bias pressure, such as ambient atmospheric pressure.

FIG. 8 illustrates a pneumatic converter bridge (PCB) which accomplishes operations in accordance with Equations 18a and 18b. By suitable transfer of flow, which may be accomplished mechanically through linkages, pneumatically by transfer of pressurized air, or electrically through solenoid action, or the like (the latter two methods being most useful for remote operation from the cockpit), a switching action is possible to change from Equation 18a operation to Equation 18b operation. If this action be made to occur simultaneously in the gross thrust and ram drag converter bridge, the remote (cockpit) indication can be made to change from an $F_n/P_a$ to an $F_n$ readout, or vice versa. It should be noted this same switching action can be appended equally well to a pneumatic or electrical primary bridge unit (FIG. 6 or FIG. 7, respectively) in a simplified thrust system with exactly the same results and flexibility and nothing in this present description of a converter bridge unit is intended to limit the invention in respect to required or desired switching action in the overall system. FIG. 9 illustrates an electrical converter bridge (ECB) which is identically analogous, except that impedance elements replace flow areas, and electrical switching and nulling are utilized.

Referring to FIG. 8, a pneumatic converter bridge and switch is illustrated. This bridge is similar to the bridge of FIG. 6 except that it has the addition of parallel structure in the area of the switch 150. The bridge has a chamber 120 provided with entrance and exit orifices 121 and 122, respectively, whose effective areas are variable through the use of plugs 123 and 124 which are mounted respectively on shafts 123a and 124a which move the axial plugs into and out of the orifices. Shaft 123a responds to signals proportional to the ratio $F/P$ developed by a PPB, EPB, or equivalent primary bridge. Plug 124 varies the effective area of orifice 122 to produce, when the bridge is nulled, a displacement of plug 124, and of connected shaft 124a and servo-piston 141, proportional to the ratio $F/P_a$ or to F (in the sense of Equation 9), depending on the position of switch valve 150. Air at pressure $P_c$ is supplied to chamber 125 through coupling 126 and has access to chamber 120 through orifice 121. The air from chamber 120 has access to chamber 127, which is vented to ambient pressure $P_a$ through the opening 128. A line 129 supplies the intermediate pressure $P_x''$ in chamber 120 to a servo valve 142.

The other cylinder of this pneumatic system is a dual or alternative cylinder and may be approached from the standpoint of considering the system provided by the arrangement shown when the switch valve 150 is in each possible position. In the position shown, an intermediate chamber 130 at pressure $P_y''$ is connected by orifices 131 and 132 to chambers 135 and 137, respectively, at compressor pressure $P_c$ and ambient pressure $P_a$, respectively. The effective size of these orifices is adjusted by plugs 133 and 134, respectively. Plug 133 is moved by shaft 133a which moves in response to changes in the ambient pressure $P_a$. The effective area of this orifice is $A_{P_a}$. Orifice 132 is varied in size by movement of shaft 134a in response to the signal pressure P (in the sense of Equation 9) to vary the area $A_p$ of the orifice 132. Air at pressure $P_c$ is supplied through a coupling 136 to chamber 135. Chamber 130 leads through orifice 132 into the chamber 137 which vents to the ambient pressure $P_a$ through an orifice 138. The intermediate pressure $P_y''$ in intermediate chamber 130 is fed from that chamber through a line 139 to the servo valve 142.

As in the case of the FIG. 6 arrangement, the primary bridge structure employs a control cylinder 140 having a servo piston 141 connected to shaft 124a to establish the position of plug 124 and thereby change its effective area to regulate $P_x''$. The servo piston is controlled by spool 143 and servo cylinder 142 which, in the event of a differential pressure in lines 129 and 139, opens either line 144 or 145 to the fluid pressure supply 146 and the other line to the ambient pressure vent 147. Again the resulting unbalance is of a sort to drive plug 124 toward a null or balanced condition.

When the switch 150 is in the position shown with the bridge nulled, the servo controlled area A of orifice 122 equals $(A_{F/P}A_p)/A_{P_a}$, where $A_{F/P}$ is the effective area at orifice 121. $A_{F/P}$ is proportional to $F/P$, $A_p$ to pressure P, and $A_{P_a}$ to ambient pressure $P_a$. The area A is proportional to the quantity $F/P_a$ when the bridge is in balance.

This device is arranged so that movable switch valve 150 in its alternative position seats against opposed flanges in vestibule chambers 151 and 152. Thus, when the valve 150 is moved to the dashed line position, air at pressure $P_c$ feeds through fitting 136 into vestibule 151 rather than chamber 135 and thence to chamber 153 through an orifice 154 to a different intermediate chamber 155 in which an intermediate pressure $P_y'''$ is developed. In this configuration, the pressure $P_y'''$ also pervades the vestibule chamber 152, which is connected through orifice 132 to chamber 137 at ambient pressure $P_a$. The opening 154 has a fixed effective area $A_k$ which is adjusted by a plug 156 on a shaft 156a. Pressure $P_y'''$ is fed to servo cylinder 142 and the operation of that device to position plug 124 is exactly as when switch valve is in the solid line position.

When the switch valve 150 is in the dashed line position and the bridge is nulled, the area $A = (A_{F/P}A_k)A_k$ and is thus proportional to F directly.

The position of valve 150 is remotely controlled through linkages 158 which are connected to a piston 159 in cylinder 160. The piston is caused to move by reversing the pressures in lines 161 and 162 from $P_c$ to $P_a$, or vice versa, as, for example, by means of a *manually* controlled remote servo valve similar to 142.

FIG. 9 illustrates the electrical equivalent of the pneumatic bridge of FIG. 8. Because of similarity, corresponding parts are given corresponding number designators with the addition of primes thereto.

In FIG. 9, the bridge voltage supply is provided through leads 126' and 128' and the servo motor system is placed across the alternate ends of the bridge, in contradistinction to the arrangement of FIG. 9, to demonstrate the interchangeability of the impedance elements involved in this general type of bridge. In the FIG. 9 arrangement the switch 150' is used to select alternatively the impedances 133' and 156' by means of the double-pole, double-throw (DPDT), switch 150'. Part of impedance 133' is shorted out by means of tap 131' so that with switch 150' in the position shown in solid lines, it is in series with impedance 123' across power supply lines 126' and 128'. Part of impedance 123' is shorted out by movable tap 121' to leave a variable impedance $Z_{F/P}$. The sum of the impedances across the power lines is $Z_{F/P}$ and $Z_{P_a}$. Impedance 156 is fixed at a value of $Z_k$ so that if switch 150' is in dashed line position the sum of the impedances is $Z_{F/P}$ and $Z_k$. Similarly, impedances 124' and 134' are in series across power supply lines 126' and 128' at the right side of the bridge. The use of tap 122' to short out part of impedance 124' produces the variable impedance Z, whereas the use of tap 132' to short out part of impedance of 134' produces the variable impedance $Z_P$. One terminal of servo motor 142 is connected between the impedances 123' and 133' or 156'. The other terminal of servo motor 142' is connected between the impedances 124' and 134'. Tap 121' is varied in direct proportion to the $F/P$ output from a PPB (FIG. 6), an EPB (FIG. 7), or equivalent primary bridge. Tap 131' is positioned in proportion to the ambient pressure $P_a$ and tap 132' in proportion to the generalized pressure P (used in the sense of the Equation 9). In the event of bridge unbalance, a voltage difference is developed at the terminals of the servo motor 142' causing it to drive the worm gear 140' which in turn drives the rack 121' and moves the tap 122' in such direction as to restore balance by modifying the impedance Z. The servo motor 142 is supplied power at terminals 164.

In the position switch 150' is shown by the full lines, when the bridge is nulled, the impedance $$Z = (Z_{F/P} Z_P / Z_{P_a})$$

and will, therefore, be proportional to the quantity $(F/P_a)$ as will also be the displacement of rack 121'. When switch 150' is in its alternate dashed line position, so that fixed impedance $Z_k$ is substituted for impedance $Z_{P_a}$, the impedance Z is equal to $(Z_{F/P} Z_P / Z_k)$ when the bridge is balanced and hence Z is proportional to thrust quantity F. The rack 121' or any extension of the rack or of the tap 122', and/or of the gear drive between the servo motor and rack 121' will assume displacements (linear or rotational) proportional to $F/P_a$ when switch 150' is up (in FIG. 9) or to F when switch 150' is down, and the bridge is in balance, and any such displacement output may be utilized, as convenient, for transmission or indication of the desired function of pressure ratios.

The displacement output from a converter bridge, or from the primary bridge in the case of simplified thrust systems, may be transmitted to the cockpit or other remote readout site for indication purposes. In the case of electrical gear generally, a wide class of transducers already exists which can convert a mechanical displacement into an electrical signal, usually a voltage, indicative of the displacement. A typical such transducer, useful for this application, is the synchro-transmitter which functions by converting the linear motion of the output or any other unique displacement function of the output to rotary drive for turning the rotor of the synchro-transmitter to develop in its three output leads voltages whose magnitudes and polarities uniquely define the shaft position. In the case of the PPB of FIG. 6, or of the ECB of FIG. 7, the nulling motor may drive through a gear reduction to create an angular output uniquely a function of the output displacement. This gear drive can operate the rotor of the synchro-transmitter to create an electrical output indicative of the bridge output. The synchro-transmitter output can be fed to a similar synchro-receiver in a gross thrust system which assumes a unique position corresponding to that of the transmitter to indicate $F_g/P_a$ or $F_g$ or to a differential synchro-receiver along with its (ram drag) counterpart to indicate $F_n/P_a$ or $F_n$ in the cockpit or other remote readout site. Other well known electrical transducers may also be used which accomplish the same function. Such electrical transducers are sufficiently well known to require no illustration. For generality, let any such electrical transmitter be designated as an ET unit, and the receiver as an ER unit when direct readout is concerned as in gross thrust systems, and as an EDR (electrical differential receiver) unit when a differential readout is required, as in net thrust systems. The corresponding pneumatic units are designated as follows: PT for pneumatic transmitter, PR for pneumatic receiver, and PDR for pneumatic differential receiver.

A pneumatic transmitter, utilizing the engine supply pressure $P_c$ and exhausting into ambient pressure $P_a$ is illustrated in FIG. 10. It is assumed in this unit that sonic flow conditions exist throughout the operation in question. If any doubt exists that such conditions pertain under some engine conditions of interest, the exhaust pressure $P_a$ may be artificially reduced by aspiration or vacuum-pumping, although experience teaches that normally the pressure ratio $P_c/P_a$ will prove adequate to assure sonic, or near sonic, conditions to make the pneumatic unit illustrated completely practical. The PT is fed from the PCB or PPB, whichever is applicable, as a displacement which is set by nulling the bridge. An output pressure is developed whose absolute value is a measure of the input displacement and, therefore, a measure of $F_g/P_a$, $F_g$, $F_r/P_a$, or $F_r$, dependent on the bridge output variable. This pressure is then fed to a PR or PDR unit in the cockpit for readout. FIG. 10 represents a simple example of a PR or PDR unit as an absolute or differential pressure gage, respectively, which is calibrated in actual or aerodynamic thrust, instead of pressure or pressure differential units.

FIG. 10 illustrates one version of a pneumatic transmitter in which compressor pressure $P_c$ is fed into compartment 170 through an orifice 171 having a fixed effective area $A_c$ to provide a pressure P within the chamber 170. Chamber 170 is connected through orifice 172 to chamber 173 which is at ambient pressure $P_a$ via the exhaust opening 174 thereof. The orifice 172 has a variable effective area $A_P$ which is obtained by moving plug 175 inwardly and outwardly by means of axial movement of support rod 175a. This movement is in proportion to that provided by displacement input proportional to $F/P_a$ or to F, for example, so that the effective area $A_P$ of orifice 172 is proportional to this quantity. The pressure P in compartment 170 is regulated by the effective size of orifice 172. Within the compartment 170 is a sub-compartment 177 which is evacuated and provided with a supporting spring 178 which bears against and supports a flexible wall or diaphragm 179 between compartments 177 and 170. This diaphragm is connected by a shaft 180a to a tapered plug 180 in orifice 181 between ambient pressure compartment 173 and a compartment 182 which is fed supply pressure $P_c$ through orifice 183 having a fixed effective area $A_c$, equal to that of orifice 171, to produce a pressure $P_F$ which depends upon the position of plug 180 in orifice 181. This position determines the effective area $A_P$ of the orifice 181. In the case of sonic flows, when equilibrium is established, $P_c A_c = P A_F = P_F A_P$, but $P = kA_P$, where $k$ is a constant of proportionality, so that $P A_F = k A_P A_F = P_F A_P$. Therefore, $P_F = k A_F = (KF/P_a)$ when $F/P_a$ is the input and is equal to $K'F$ when F is the input, where K and K' are different constants of proportionality. Therefore, the output pressure $P_F$, when fed to a pressure responsive indicator, such as PR or PDR, through line 184 without bleed, is a pneumatic measure of the input displacement.

The final elements in any of the thrust systems under consideration may be considered the receiver, or indicator. A pneumatic receiver, designated by PR, receives the pressure transmitted by a PPB–PT or PCB–PT combination, and converts same into an indication of $F_g/P_a$ or $F_g$ in a gross thrust system, or into an indication of $F_r/P_a$ of $F_r$ in a ram drag system, etc. An absolute pressure gage, calibrated in suitable units, or any other suitable pressure-sensitive device, would constitute a PR unit. A pneumatic differential receiver, designated PDR and typified by a differential pressure gage or equivalent, calibrated in thrust units, receives one such pressure transmission from a gross thrust PT unit and another such pressure transmission from a similar ram drag PT unit and indicates the differential pressure in terms of $F_n/P_a$ or $F_n$. Analogously, an ER unit is an electrical receiver, such as a synchro-receiver unit or equivalent, which indicates $F_g/P_a$, $F_g$, $F_r/P_a$, or $F_r$, as desired. An EDR is an electrical differential receiver, such as a synchro differential receiver or equivalent, and indicates $F_n/P_a$ or $F_n$, as desired.

It is assumed that a single-switch in the pilot's cockpit provides the switch changeover in both the gross thrust and ram drag PCB's or PPB's effecting the change from a reading of $F_n/P_a$ to $F_n$ or vice versa. If a gross thrust indication is satisfactory, a gross thrust computer system feeding an ER or PR unit suffices. If a net thrust indication is desired, a gross thrust and a ram drag computer system feeding an EDR or a PDR unit is required. It is also feasible to establish a switching system based on the components disclosed herein, to indicate separately $F_g/P_a$, $F_r/P_a$ and $F_n/P_a$ or their equivalents $F_g/\delta_a$, $F_r/\delta_a$, and $F_n/\delta_a$, where $\delta_a$ is simply the ratio of ambient pressure, $P_a$ to the standard (sea-level) ambient atmospheric pressure, alternatively $F_g$, $F_r$ and $F_n$, as desired, for engine performance detection or evaluation. These variants will be understood to be alternative aspects of this invention. The generation or development of pneumatic or electrical signals proportional to any of the above quantities, for use in thrust systems for purposes of engine and/or aircraft performance control shall likewise be considered a part of this invention. In such a case, the receiver unit may or may not be included, depending on requirements of the system desired.

In order to indicate the coverage of the invention, FIGS. 11–19 diagrammatically show several illustrative thrust systems comprised of the units described above, in block diagram form. For purposes of showing maximum flexibility, as well as demonstrating their scope from the invention standpoint, each diagram indicates generally complete interchangeability of pneumatic and electrical elements of the same type since such interchangeability falls within the spirit and description of this invention, and every combination of such elements possible shall be construed to be disclosed herein to the same extent as were they individually disclosed.

FIGS. 11–19 illustrate various thrust systems which are developable by incorporating into one system the various elements or components described. In all of these systems, it is assumed the pneumatic power supply is constituted by the pressure system difference ($P_c - P_a$) extracted from the engine, and that the electrical power supply is constituted by some airborne generator developing a D.C. or A.C. voltage suitable for operating the bridges, computers, and indicators of the systems. Power supplies whether the potential difference they produce is pneumatic pressure difference or electrical potential difference are designated hereafter PS. Any equivalent pneumatic or electrical supply, however generated, is usable and the invention is not in any sense limited as to power supply, except insofar as the elements of said invention require adequate potential and flow characteristics of the operating medium (gas flow or electrical current) as to be practically operative. The illustrations of FIGS. 11–19 may be tabulated as follows.

FIGS. 11–15 show systems made up of components previously described. FIGS. 16–19 show systems made up using the system of FIGS. 11 to 15 or similar systems as sub-systems.

FIG. 11 illustrates a system which is capable of yielding approximate gross thrust in accordance with Equation 4 above. In this system, the power supply is fed in at the places shown by the letters PS and the variables are introduced at the places shown. Pressures $P_{t6}$ and $P_{s6}$ are fed into the function generator 190 which produces an output $$f'\left(\frac{P_{t6}}{P_{s6}}\right)$$

This output is fed into the primary bridge 191 into which is also fed the pressure difference ($P_{t6} - P_a$) and an adjustment for size factor $A_6$. As a result of these inputs, an output measure of $F_g$ is obtained and fed to transmitter 192. As a result of the action of the transmitter, a signal proportional to $F_g$ is fed from the power plant or computer region to the cockpit or other remote indicating site via appropriate transmission line 193 and in the cockpit on the instrument panel is provided an appropriate receiver and readout instrument 194. It will be observed that this system performs in accordance with Equation 4 above to give a readout at 194 which is calibrated in terms of gross thrust.

The system of FIG. 12 performs in accordance with Equation 14 above. Again power supply is provided for each of the units at the places designated PS. In this case two function generator units 195 and 196 are employed. Into function generator 195 are fed signals representing $P_{t6}$ and $P_{s6}$ so that an output function $$f\left(\frac{P_{t6}}{P_{s6}}\right)$$

is obtained. Into function generator 196 are introduced pressures $P_{t6}$ and $P_a$ such that an output $f'_g(r)$ is obtained. The outputs of each of these function generators together with a separate measurement of ambient pressure $P_a$ and a fixed factor for the size factor of the engine $A_6$ is fed to primary bridge 197 which is provided with a switch 198 such that in the solid line position shown it produces an output measure of $F_g$ and in the dashed line position shown it produces an output measure of $$\frac{F_g}{P_a} \left(\text{or of } \frac{F_g}{\delta_a}\right)$$

which ever signal output is produced is fed into transmitter 199 to provide a signal which can be transmitted from the power plant envelope through line 200 to a suitable receiver 201 remote in the cockpit. Receiver 201 may be calibrated in suitable output units with alternative scales either in terms of $F_g$ or in terms of $F_g/P_a$ or of $F_g/\delta_a$.

It will be observed that FIGS. 12 and 14 illustrate the use of a primary bridge in place of a converter bridge for application in obtaining simplified exact gross thrust, in accordance with Equation 14 and the ram drag for low-speed aircraft, in accordance with Equation 17, is a direct substitution of structure insofar as the thrust-to-pressure ratio measures are considered the useful outputs. For example, a measure of $F_g/P_a$ (or $F_g/\delta_a$) is obtained directly from the primary bridge instead of $F_g/P_{t6}$ and $F_r/P_a$ (or $F_r/\delta_a$) is obtained directly from the primary bridge instead of $F_r/P_{t2}$.

In order to obtain absolute thrust measures from the primary bridge, however, a direct substitution from the converter bridge cannot be made in respect to the switch structure. In the converter bridge, switch action changes the output from a measure of $F/P$ to a measure of $F$; since the elements of the primary bridge circuits are not analogous to those of the converter bridge, a switch capable of accomplishing this same function in the primary bridge and such to result in effective reduction of total structure must be somewhat more complex. In this switch, one side inserts an element which can be adjusted proportional to ($1/A$), where A generally represents the size factor ($A_2$ for ram drag, $A_6$ for gross thrust); such use will result generally in an output which is a measure of $F/P_a$ or ($F/\delta_a$) ($F_r/P_a$ for ram drag, $F_g/P_a$ for gross thrust). In order to effect direct thrust output measures, the alternate switch position inserts an element (a variable orifice for PPB gear; a variable impedance for EPB gear, etc.) which varies its effective area or impedance, etc., proportionally to ($1/P_aA$), where $P_a$ is the ambient pressure, and A the proper size factor. Since the size factor A will be a constant in any application and adjustment is provided for flexibility and rangeability of the components, not much will be sacrificed in putting this adjustment into the bridge which effects the variation of the alternate switch element. FIG. 20a, for example, shows a means for accomplishing this purpose with a variable area element and FIG. 20b shows an identical means for a variable impedance element.

FIG. 20a shows an arrangement substitutable for the arrangement associated with chamber 95 in FIG. 6. Corresponding elements to those in FIG. 6 are designated by corresponding numbers with the addition of a "p" thereafter. For example, the chamber 95p receives the supply pressure $P_c$ through coupling 96p and discharges into an adjacent chamber not shown corresponding to chamber 90 through orifice 91p. A plug 93p is varied by axial movement of shaft 93ap to change the effective area of orifice 91p. In this case, the effective size of the orifice varies alternatively as the reciprocal of size factor $1/A$ or the reciprocal of the product of ambient pressure by the size factor ($1/P_a \times 1/A$). The structure which permits the switching includes a pressure chamber 230 which is provided with ambient pressure $P_a$ through a vent 231. Within this chamber is an evacuated bellows 232 subjected to the pressure $P_a$. Movement of the bellows in response to the pressure $P_a$ actuates a linkage 233 through shaft 234. Linkage 233 is slidably connected to shaft 93*ap* and rotates about a fulcrum pin 235. The position of the fulcrum pin 235 is adjusted in order to change the size factor effect by movement in a vertically oriented slot 236. A locking mechanism 237 is provided to hold the bellows in a fixed position in one position of the switching device when desirable as explained below.

FIG. 20*b* illustrates an alternative arrangement for use in systems like those of FIGS. 12 and 14 for substitution in the type of primary bridge shown in FIG. 7. More specifically, the substitution is for bridge element impedance 93' which represents the size factor effect. The impedance 92*e* is switchable into the bridge of FIG. 7 in place of the impedance 93'. The impedance 93*e* differs from that of 93' in that it is non-linear to account for the inverse relationship of the impedance to the variable involved. The tap 91*e* is varied by a shaft 93*ae* which is directly analogous to shaft 93*ap* in FIG. 20*a* by a linkage and pressure system generally designated 240 which corresponds to that shown in FIG. 20*a*. In this type of bridge the adjustment for size factor will have to adjust the bridge as well as the $1/A$ element of the switch system, preferably simultaneously, so that one simple adjustment is needed. In order to do away with this inconvenience, it is possible in the arrangements shown in FIGS. 20*a* and 20*b* to have the switch action lock the $P_a$ bellows, or equivalent assembly, in a fixed definite position and vary the A adjustment when an $F/P_a$ output measure is desired and to unlock this linkage, thereby permitting free $P_a$ action, whenever a measure of absolute thrust or ram is required. The nature of this type of adjustment is relatively common and its image will be evident to those skilled in the art without further elaboration. Consequently, the switch action in a primary bridge will invoke two alternate conditions:

(1) The $P_a$ action is locked in a fixed position so that only the A adjustment is effective in the bridge circuit, and a measure of $F/P_a$ (or $F/\delta_a$) is obtained; or (2) alternatively, the $P_a$ action is unlocked and the element is operated on by the combined effect of $P_aA$ such that the effective area or impedance is varied in proportion to $1/P_aA$.

This switch action is, therefore, different than utilized in the converter bridge, in the interests of simpler structure, whenever it is desirable and preferable to utilize the primary bridge structure, as in cases where Equations 14 and 17 are applicable. FIGS. 12 and 14, which show usage of primary bridges and switches show separate inputs for size factor and ambient pressure schematically to cover these alternatives.

The above discussion also causes alternative uses of the primary and/or converter bridges in that the application of a variable element in such bridges which operates in proportion to $1/P_a$, in place of those sections utilizing an $1/A$ adjustment will result in a bridge output measure of $F/A$ instead. Since A is a constant size factor, this can be adjusted for in the pneumatic or electrical (differential) receivers, wherever necessary, by usual linkage or scale factor provisions common in the art. This invention recognizes this alternative usage of the formulas and components described and these type approaches are considered to fall within the scope and spirit of this invention as well.

The system shown in FIG. 13 is intended to produce exact gross thrust in accordance with Equation 1. The system of FIG. 13 employs similar elements to those used in the system of FIG. 12 with the addition of a converter bridge 203. In this system the pressures $P_{t_6}$ and $P_{s_6}$ are fed into function generator 195' to obtain $f(r_6)$. Pressures $P_{t_6}$ and $P_a$ are fed into function generator 196' to produce $f_g(r)$. The outputs of each of the function generators are fed into the primary bridge 197' together with the size factor $A_6$ adjustment and primary bridge 197' produces an output measure of $F_g/P_{t_6}$. This output is fed into the converter bridge 203 together with signals inputs representative of $P_a$ and $P_{t_6}$. In the output, selection of the position of the switch 198' permits obtaining either a measure of $F_g$ (in the full line position shown) or else a measure of $F_g/P_a$ (or of $F_g/\delta_a$) in the alternate position (shown by dashed lines). These alternative values are fed into transmitter 199' which produces a signal which can be transmitted through line 200 from the powerplant envelope to the cockpit receiver 201. Cockpit receiver is preferably calibrated with alternative scales for $F_g$ or $F_g/P_a$ (or possibly $F_g/\delta_a$).

The system of FIG. 14 is essentially like that of FIG. 12 but the parameters fed into the components are changed in order to give ram drag in accordance with Equation 17. Again, a power supply PS is provided of the kind and type needed. A pair of function generators 205 and 106 are supplied. To generator 205 are fed the pressure signals $P_{t_2}$ and $P_{s_2}$ so that the output of generator 205 is $f(r_2)$. The pressures fed to generator 206 are $P_{t_2}$ and $P_a$ so that the output is $f_a(\delta)$. The outputs from the function generators 205 and 206 together with an adjustment representing size factor $A_2$ are fed to primary bridge 207 which, according to the position of its switch 208, produces alternative outputs. In the solid line position shown, the output is a measure of $F_r$, and in the dashed line position shown, the output is a measure of $F_r/P_a$ (or of $F_r/\delta_a$). Whichever output is obtained is fed to transmitter 209, which employs an appropriate transmission line 210 to connect to the remote receiver 211 located in the cockpit. The receiver is calibrated alternatively in terms of $F_r$ or in terms of $F_r/P_a$ (or of $F_r/\delta_a$).

FIG. 15 has the same relationship to FIG. 14 as FIG. 13 has to FIG. 12. More specifically, FIG. 15 shows a system for obtaining exact ram drag in accordance with Equation 5. It will be seen that all of the corresponding components employed in FIG. 14 are employed in FIG. 15, so that corresponding components are designated by corresponding numbers with the addition of primes thereto. A conversion bridge 213 is added in this system for application to highspeed aircraft. In this case the function generators 205' and 206' produce measures of $f(r_2)$ and of $f_a(\delta_{NS})$, respectively, which are fed into the primary bridge 207' together with the size factor $A_2$ adjustment to obtain a measure of $F_r/P_{t_2}$ which, in turn, is fed into converter bridge 213. Also fed into converter bridge 213 are signals representative of pressures $P_a$ and $P_{t_2}$. Alternative outputs through switch 208 are possible. With the solid line position of switch 208', the output is a measure of $F_r$; in the dashed line position, it is a measure of $F_r/P_a$ (or of $F_r/\delta_a$). Whichever signal is received at the transmitter is transmitted over a suitable transmission line 210' to the receiver 211'. Receiver 211' in the cockpit, or other remote reactant site, is suitably calibrated in terms of $F_r$ and/or in term of $F_r/P_a$ (or of $F_r/\delta_a$).

The systems shown in FIGS. 16–19 are representative of composite net thrust systems which can be made from the gross thrust and ram drag systems previously shown and described by FIGS. 11–15. In FIG. 16, for example, approximate net thrust for low speed aircraft is obtained in accordance with Equations 4 and 17 by combining the systems of FIGS. 11 and 14. Only the portions of these systems within the powerplant envelope are required and these are indicated by designators 215 and 216, respectively. The transmitter output from system 215 is a measure of $F_g$ and that from system 216 is a measure of $F_r$. These outputs are fed into a differential receiver 217 which produces a difference output measure of $F_n$.

FIG. 17 is a schematic representation of a net thrust system derived from the gross thrust and ram drag systems of FIGS. 12 and 14 or, at least, those portions of the system within the powerplant envelope. This combination permits a simplified net thrust system for low speed aircraft in accordance with Equations 14 and 17. As seen, the output of the gross thrust system of FIG. 12, designated 218, is a measure of $F_g$, or alternatively, of $F_g/P_a$ (or $F_g/\delta_a$). The output of system 219, the ram drag system represented by FIG. 14, is a measure of $F_r$, or alternatively of $$F_r/P_a$$

(or of $F_r/\delta_a$). The transmitter outputs from these two systems are combined in a differential receiver 220 to provide an output representative of net thrust which may either be $F_n$ or, alternatively $F_n/P_a$ (or $F_n/\delta_a$).

The system of FIG. 18 shows a net thrust system obtained by combining the gross thrust and ram drag systems of FIG. 12 and FIG. 15 or, at least, the portions thereof within the powerplant envelope. This system represents a simplified exact net thrust system for use by high-speed aircraft in accordance with Equations 14 and 5. Here, the output of the gross thrust system 222, the system of FIG. 12, is a measure of $F_g$, or, alternatively, of $F_g/P_a$ (or $F_g/\delta_a$), while the output of the ram drag system of FIG. 15, designated 223, is a measure of $F_r$ or, alternatively, of $F_r/P_a$ (or of $F_r/\delta_a$). The two transmitted output signals are combined in the differential receiver 224 to produce an output signal representing net thrust $F_n$ or, alternatively, $F_n/P_a$ (or $F_n/\delta_a$).

Finally, FIG. 19 illustrates an exact net thrust system for high-speed aircraft in accordance with Equations 1 and 5 in which those portions of gross thrust and ram drag systems within the powerplant envelope in FIGS. 13 and 15, respectively, are combined. The output of the gross thrust system 226, the system of FIG. 13, is a measure of $F_g$ or, alternatively, of $F_g/P_a$ (or of $F_g/\delta_a$). The output of the ram drag system 227, the system of FIG. 15, is a measure of $F_r$ or, alternatively, of $F_r/P_a$ (or $F_r/\delta_a$). These transmitted signals are combined in a differential receiver 228 to produce an output representing $F_n$ or, alternatively, $F_n/P_a$ (or $F_n/\delta_a$).

Other combinations of ram drag and gross thrust systems to form net thrust systems are likewise possible, although generally trivial or unlikely systems will result. The above combinations are certainly typical and practical systems, but shall not be construed to limit the coverage of this invention thereby. One other practical but approximately approach, and the accompanying system of net thrust combinations, is obtainable by assuming it is possible in many aplications to approximate the ram drag by an equation of the form $$F_r = KA_2[(P_{t_2})_{NS} - P_a] \qquad (19)$$

The percent error in this equation will be most severe for low flight speeds, but it is usual here for the ram drag to be a small part of the net thrust so that the overall accuracy for net thrust computation may not be severely compromised. When an equation of form 19 is practical, an approximate ram drag system based thereon becomes analogous to the aproximate gross thrust system predicated on Equation 4 and the following additional systems, which are not herein illustrated, become feasible.

(I) Approximate ram drag system using Equation 19.
(II) Approximately net thrust system using the system of FIG. 11, and that of Equation 19.
(III) Net thrust system using the system of FIG. 12 and that of Equation 19.
(IV) Net thrust system using the system of FIG. 13 and that of Equation 19.

Equations 1, 5, 14 and 17 are general expressions for gross thrust and ram drag quantities. These equations are directly applicable a priori to jet engine type powerplants, provided only that suitable values of the size factors $A_2$ and $A_6$ are utilized, the A's being fixed engine size factors, inclusive of flow distribution, instrument-loading restriction effects, and bleed effects, if present at the stations of measurement. It is preferable that thrust performance be obtained independently of the exact configuration of the inlet and exhaust geometries of the engine, note being made of the fact that the above formulas do take into account the compression and expansion effects, from a thrust standpoint, of both these geometries. Although the expansion performance insofar as jet formation (as in the divergent portion of the exhaust nozzle) is ignored in its secondary (e.g. frictional) effects, it is not ignored in its area ratio effects, which account for the predominant jet formation aspects. Since, however, the above mentioned equations and their various derivative equations are all based on aerodynamic and thermodynamic laws, it becomes feasible with these same equations, with a priori calibration, to tailor any thrust system described herein very exactly to any configuration specified, if so desired, simply by regarding these equations as logical expressions of ram drag and gross thrust and determining by experiment the correct values of size factors and the exact contouring of the various compression, expansion, and duct Mach number functions required to meet the application. The same apparati are usable for this less flexible, but possibly more accurate, determination of drag and thrust quantities. This applicability of the formulas is more readily apparent when it is realized that, speaking generally, (1) the size, or A-factor, can accommodate flow restriction, bleed, and distribution effects; (2) the compression or expansion functions, $f_a$, $f_a'$, $f_g$, or $f_g'$, can accommodate the performance effect; (3) the flow Mach number functions, $f$ or $f'$, can accommodate the flow loading effect; and (4) where necessary, the $P_a$-factor can accommodate an altitude effect, should this develop an independent source for error. Consequently, this invention, in its various forms, can be regarded as extremely general for the application intended.

One of the real advantages of the present invention is the potential for determining not only the gross thrust, but likewise the ram drag and net thrust with highly flexible equipment. This equipment utilizes similar mechanism at the compression and expansion sides of the engine without extensive or expensive calibrations, if it so be desired, or with complete tailoring for accuracy in specific installations, if such calibrations are considered desirable. Furthermore, it is believed this invention permits, for the first time, an accurate determination of ram drag suitable for *airborne* installations. The freedom from coupling to any variable geometry, both at the front and rear ends of the engines, and the use only of pressure measurements and computation only of aero-thermodynamic relations, upon which the performance of *any* engine utimately depends, are likewise considered very strong advantages of this invention.

It will also be apparent, to any personnel skilled in this art, that many variations in the apparatus disclosed, as general as these have been presented, are possible, without inherently affecting the flexibility and applicability of the invention. All apparatus systems and methods within the scope of the claims are intended to be within the scope and spirit of the invention.

I claim:

1. A gross thrust meter for a jet-type engine comprising a function generator for receiving signals representing total and static pressures in the exhaust region of the engine and producing an output signal proportional to a predetermined function of the ratio of total to static pressure in the exhaust region, means for producing an output signal proportional to the ratio of total pressure in the exhaust region and the ambient pressure, primary bridge means for receiving as inputs each of these output signals together with a signal proportional to the size factor at the exhaust region and combining these signals to produce an output signal proportional to the product of these input effects to produce gross thrust.

2. The system of claim 1 in which a suitable transmitter member is provided to receive the gross thrust signal and transmit the signal to a remote receiver element.

3. A simplified system for obtaining gross thrust in a jet type engine comprising a function generator for receiving signals representing total and static pressures at the exhaust region and producing an output signal proportional to a predetermined function of the ratio of total to static pressure in the exhaust region, a second function generator for receiving signals proportional to total pressure in the exhaust region and ambient pressure and producing an output signal proportional to a predetermined function of the ratio of total exhaust pressure to ambient pressure, primary bridge means including switch means for combining the output functions as input bridge signals with an input signal proportional to size factor at the exhaust to produce an output signal proportional to the product of the selected input effects to approximate gross thrust.

4. The system of claim 3 in which suitable transmitter member is provided to receive the bridge output signal and transmit that signal to a remote receiver element.

5. A system for producing signals proportional to gross thrust in a jet-type engine comprising a function generator responsive to signals of total and static pressure at the exhaust region for producing a signal output proportional to a predetermined function of the ratio of total to static pressure at the exhaust region, a second function generator responsive to signals proportional to the total pressure at the exhaust region and the ambient pressure outside of the engine to produce a signal output proportional to a predetermined function of the ratio of the total pressure at the exhaust to the ambient pressure, bridge means for combining these signals together with a signal proportional to size factor in the exhaust region to produce an output signal which is proportional to the thrust divided by the total pressure at the exhaust region, a second bridge receiving said output signal from the first bridge together with a signal proportional to the ambient pressure and a signal proportional to the total pressure at the nozzle entrance region to produce a product of the output signal from the first bridge and the total pressure in the exhaust region, and a switch which alternatively in accordance with switch positions includes or excludes the ambient pressure signal, to produce a bridge output either of gross thrust or the ratio of gross thrust to the ambient pressure.

6. The system of claim 5 in which suitable transmitter means is provided to receive the gross thrust signal and transmitted to a remote receiver.

7. A system for producing signals proportional to ram drag in a jet-type engine comprising a function generator responsive to the signals proportional to total and static pressure in the compressor entrance region in order to produce a signal proportional to a predetermined function of the ratio of total to static pressures at the compressor entrance region, a second function generator responsive to signals proportional to the total pressure at the compressor entrance region and ambient pressure to produce an output signal proportional to another predetermined function of the ratio of total pressure in the compressor entrance region to ambient pressure and a bridge means for combining as a product these signals together with a signal proportional to size factor in the compressor entrance region to produce an output signal proportional to ram drag.

8. The system of claim 7 in which suitable transmitter means is provided to receive the ram drag signal and transmit it to a remote receiver.

9. In a system for utilizing predetermined function signals for measurement of ram drag in a jet-type engine having a pressure intake region, a bridge means for combining predetermined function signals such as a function of the ratio of a total pressure in the compressor entrance region to the ambient pressure and another function of the ratio of the total to the static pressure in the compressor inlet region with a signal representative of the total to the static pressure in the compressor entrance region in a product relationship together with a signal representative of size factor at the compressor intake in the engine in a product relationship a switch means alternatively in accordance with switch positions to generate an output proportional to ram drag or to ram drag divided by ambient pressure depending upon an internal switch position.

10. A system for producing signals proportional to ram drag in a jet-type engine comprising a function generator responsive to signals proportional to total and static pressure at the compressor entrance region for generating a signal proportional to a predetermined function of the ratio of the total to static pressure at the compressor entrance region, a second function generator responsive to signals proportional to the total normal shock pressure outside the engine and ambient pressure to generate a signal proportional to a predetermined function of a ratio between a said normal shock pressure and the ambient pressure, bridge means for combining these function signals together with a signal proportional to the size factor at the compressor entrance region for producing an output signal proportional to the ratio of the ram drag to the total pressure at the compressor entrance region, a second bridge means for combining the signal output from the first bridge together with signals proportional to ambient pressure and the total pressure at the compressor intake to produce a product of the output of the first bridge and the total pressure in the compressor intake region, and a switch alternatively in accordance with switch positions to include or exclude the ambient pressure signal to produce a bridge output proportional to either ram drag or the ratio of ram drag to ambient pressure.

11. The system of claim 10 in which suitable transmitter means is provided to receive the ram drag signal and transmit it to a remote receiver.

12. The method of obtaining measurements proportional to jet-type forces in a jet-type engine comprising
    detecting at least two independent variable pressures in a particular region of the engine,
    detecting at least one other independent variable pressure outside the engine,
    producing signals dependent upon such pressures and combining said signals into three independent functions, including a predetermined function of the ratio of any pair of said pressures and another predetermined function of the ratio of any other pair of said pressures, and
    combining said functions in a product relationship employing no independent variables other than pressures to obtain signals proportional to such jet-type forces.

13. The method of obtaining measurements proportional to gross thrust type forces in a jet-type engine comprising
    detecting at least two independent variable pressures in the exhaust region of the engine,
    detecting at least one other independent variable pressure outside the engine representative of ambient pressure,
    producing signals dependent upon such pressures and combining said signals into three independent functions, including a predetermined function of the ratio of any pair of said pressures and another predetermined function of the ratio of any other pair of said pressures, and
    combining said functions in a product relationship employing no independent variable other than pressures to obtain signals proportional to such gross thrust type forces.

14. The method of obtaining measurements proportional to ram drag type forces in a jet-type engine comprising detecting at least two independent variable pressures in the compressor entrance region of the engine, detecting at least one other independent variable pressure outside the engine representative of ambient pressure, producing signals dependent upon such pressures and combining said signals into three independent functions, including a predetermined function of the ratio of any pair of said pressures and another predetermined function of the ratio of any other pair of said pressures, and combining said functions in a product relationship employing no independent variables other than pressures to obtain signals proportional to such ram drag type forces.

15. The method of obtaining measurements proportional to net thrust type forces in a jet-type engine comprising detecting at least two independent variable pressures in the engine exhaust region of the engine, detecting at least two independent variable pressures in the compressor entrance region of the engine, detecting at least one other independent pressure outside the engine representative of ambient pressure, producing signals dependent upon such pressures and combining said signals into three independent functions containing only the pressure signals from the engine exhaust and ambient regions, including a predetermined function of the ratio of any pair of said independent engine exhaust region and ambient region pressures and another predetermined function of the ratio of any other pair of said independent engine exhaust region and ambient region pressures, and separately combining signals into three independent functions containing only the pressure signals from the engine compressor entrance and ambient regions, including a predetermined function of the ratio of any pair of said independent engine compressor entrance region and ambient region pressures and another predetermined function of the ratio of any other pair of said independent engine compressor entrance region and ambient region pressures, combining the functions relating to the engine exhaust and ambient regions in a product relationship employing no variables other than pressures to obtain signals proportional to gross thrust type forces, combining the functions relating to the engine compressor entrance and ambient regions in a product relationship employing no independent variables other than pressures to obtain signals proportional to ram drag type forces, and combining the gross thrust and ram drag signals to obtain their difference, a signal proportional to net thrust type force.

16. The method of obtaining measurements proportional to ram drag type forces in a jet-type engine comprising detecting at least two independent variable pressures in the compressor entrance region of the engine, detecting two other independent pressures outside the engine representative of the ambient and normal shock total pressures under which the engine is operating, producing signals dependent upon such pressures and combining said signals into three independent functions, including a predetermined function of the ratio of any pair of said pressures and another predetermined function of the ratio of any other pair of said pressures, and combining said functions in a product relationship employing no independent variables other than pressures to obtain signals proportional to such ram drag type forces.

17. The method of obtaining measurements proportional to gross thrust type forces in a jet-type engine comprising detecting two independent variable pressures representative of total and static pressures in the exhaust region of the engine, detecting a pressure outside of the engine representative of ambient pressure, producing signals dependent upon such pressures and combining said signals into three independent functions, including a predetermined function of the ratio of any pair of said pressures and another predetermined function of the ratio of any other pair of said pressures, and combining said functions in a product relationship employing no independent variables other than pressures to obtain said gross thrust type force proportional measurements.

18. The method of obtaining measurements in a jet-type engine proportional to gross type thrust forces divided by one of the pressures detected comprising detecting two independent variable pressures representative of the total and static pressures in the exhaust region of the engine, detecting the ambient pressure outside of the engine, producing signals dependent upon such pressures and combining said signals into at least two independent functions including a predetermined function of the ratio of any pair of said pressures and another predetermined function of the ratio of any other pair of said pressures, and combining said functions in a product relationship employing no independent variables other than such pressures to obtain signals proportional to gross thrust type forces divided by one of the pressures detected.

19. The method of obtaining measurements proportional to ram drag type forces in a jet-type engine comprising detecting two independent variable pressures representative of total and static pressure in the compressor entrance region of the engine, detecting a pressure outside of the engine representative of ambient pressure, producing signals dependent upon said pressures and combining said signals into three independent functions, including a predetermined function of the ratio of any pair of said pressures and another predetermined function of the ratio of any other pair of said pressures, and combining said functions in a product relationship employing no independent variables other than pressures to obtain said ram drag type force proportional measurements.

20. The method of obtaining measurements in a jet-type engine proportional to ram drag type forces divided by one of the pressures detected comprising detecting two independent variable pressures representative of the total and static pressures in the compressor entrance region of the engine, detecting the ambient pressure outside of the engine, producing signals dependent upon such pressures and combining said signals into at least two independent functions, including a predetermined function of the ratio of any pair of said pressures and another predetermined function of the ratio of any other pair of said pressures, and combining said functions in a product relationship employing no independent variables other than the pressures to obtain signals proportional to ram drag type forces divided by one of the pressures detected.

21. The method of obtaining measurements proportional to net thrust type forces in a jet-type engine comprising detecting two independent variable pressures representative of the total and static pressures in the exhaust region of the engine, detecting two independent variable pressures representative of the total and static pressures in the compressor entrance region of the engine, detecting the ambient pressure outside of the engine, producing signals dependent upon such pressures and combining said signals into the three independent functions containing only the pressure signals from the engine exhaust and ambient regions, including a predetermined function of the ratio of any pair of said independent engine exhaust region and ambient region pressures and another predetermined function of the ratio of any other pair of said independent engine exhaust region and ambient region pressures, and separately combining said signals into the three independent functions containing only the pressure signals from the engine compressor entrance and ambient regions, including a predetermined function of the ratio of any pair of said independent engine compressor entrance region and ambient region pressures and another predetermined function of the ratio of any other pair of said independent engine compressor entrance region and ambient region pressures, combining the functions relating to the engine exhaust and ambient regions in a product relationship employing no independent variables other than pressures to obtain signals proportional to gross thrust type forces, combining the functions relating to the engine compressor entrance and ambient regions in a product relationship employing no independent variables other than pressures to obtain signals proportional to ram drag forces, combining the gross thrust and ram drag signals to obtain a signal proportional to their difference which is a net thrust type force.

22. The method of obtaining measurements proportional to net thrust type forces divided by a pressure in a jet-type engine comprising detecting two independent variable pressures representative of the total and static pressures in the exhaust region of the engine, detecting two independent variable pressures representative of the total and static pressures in the compressor entrance region of the engine detecting the ambient pressure outside the engine, producing signals dependent upon such pressures and combining said signals into at least two independent functions containing only the pressure signals from the engine exhaust and ambient regions, including a predetermined function of the ratio of any pair of said independent engine exhaust region and ambient region pressures and another predetermined function of the ratio of any other pair of said independent engine exhaust region and ambient region pressures, and separately combining signals into at least two independent functions containing only the pressure signals from the engine compressor entrance and ambient regions, including a predetermined function of the ratio of any pair of said independent engine compressor entrance region and ambient region pressures and another predetermined function of the ratio of any other pair of said independent engine compressor entrance region and ambient region pressures, combining the functions relating to the engine exhaust and ambient regions in a product relationship employing no variables other than pressures to obtain signals proportional to gross thrust type forces divided by the ambient pressure, combining the functions relating to the engine compressor and ambient regions in a product relationship employing no independent variables other than pressures to obtain signals proportional to ram drag forces divided by the ambient pressure, and combining the gross thrust and ram drag signals to obtain a signal proportional to the difference which is a net type force divided by the ambient pressure.

23. The method of obtaining measurements proportional to ram drag forces in a jet-type engine comprising detecting two independent variable pressures representative of the total and static pressure in the compressor entrance region of the engine, detecting normal shock total and ambient pressures outside the engine, producing signals dependent upon said pressures and combining said signals into three independent functions, including a predetermined function of the ratio of any pair of said pressures and another predetermined function of the ratio of any other pair of said pressures, and combining said functions in a product relationship employing no independent variables other than pressures to obtain signals propotrional to such ram drag type forces.

24. The method of obtaining measurements in a jet-type engine proportional to ram drag type forces divided by one of the pressures detected, comprising detecting two independent variable pressures representative of the total and static pressure in the compressor entrance region of the engine, detecting pressures outside the engine representative of normal shock total and ambient pressures, producing signals dependent upon said pressures and combining said signals into at least two independent functions, including a predetermined function of the ratio of any pair of said pressures and another predetermined function of the ratio of any other pair of said pressures, and combining said functions in a product relationship employing no independent variables other than pressures to obtain signals proportional to ram drag type forces divided by one of the pressures detected.

25. The method of obtaining measurements proportional to gross type thrust forces in a jet-type engine comprising detecting total and static pressures in the exhaust region of the engine, detecting pressure outside of the engine representative of ambient pressure, producing signals dependent upon such pressures and combining said signals into at least two independent functions, including a predetermined function of the ratio of total to static pressure in the exhaust region, and another predetermined function of the ratio of total exhaust region pressure to ambient pressure, and combining said functions in a product relationship employing no independent variables other than said three pressures to obtain said gross thrust force proportional measurements.

26. The method of obtaining measurements in a jet-type engine proportional to gross thrust type forces divided by ambient pressure comprising detecting total and static pressures in the exhaust region of the engine, detecting ambient pressure outside the engine, producing signals dependent upon such pressures and combining said signals into the ratio of total pressure in the exhaust region to ambient pressure, and into some predetermined function of this ratio, combining further said signals into the ratio of total to static pressure of the exhaust region and into some predetermined function of this second ratio, and combining said functions in a product relationship employing no independent variables other than said three pressures to obtain signals proportional to gross thrust type forces divided by ambient pressure.

27. The method of obtaining measurements proportional to ram drag type forces in a jet-type engine comprising
   detecting total and static pressures in the compressor entrance region of the engine,
   detecting the ambient pressure outside the engine,
   producing signals dependent upon said pressures and combining said signals into at least two functions, including a predetermined function of the ratio of the total compressor entrance region pressure to ambient pressure and another predetermined ratio of total to static pressures in the compressor entrance region, and
   combining said functions in a product relationship employing no independent variables other than pressures to obtain ram drag type force proportional measurements.

28. The method of obtaining measurements in a jet-type engine proportional to ram drag type forces divided by ambient pressure comprising
   detecting total and static pressures in the compressor entrance region of the engine,
   detecting the ambient pressure outside of the engine,
   producing signals dependent upon such pressures and combining said signals into the ratio of total pressure in the compressor entrance region to ambient pressure and into some predetermined function of this ratio, combining further said signal into the ratio of total to static pressure of the compressor entrance region and into some predetermined function of this second ratio, and combining said functions in a product relationship employing no independent variables other than said three pressures to obtain signals proportional to ram drag type forces divided by ambient pressure.

29. The method of obtaining measurements proportional to ram drag forces in a jet-type engine comprising
   detecting total and static pressures in the compressor entrance region of the engine,
   detecting normal shock total and ambient pressures outside of the engine,
   producing signals dependent upon such pressures and combining said signals into at least two functions including a predetermined function of the ratio of the normal shock total pressure to the ambient pressure outside the engine, and another predetermined function of the ratio of the total to static pressures of the compressor entrance region, and
   combining said functions in a product relationship employing no independent variables other than said four pressures to obtain said ram drag type force proportional measurements.

30. The method of obtaining measurements in a jet-type engine proportional to ram drag type forces divided by ambient pressure comprising
   detecting total and static pressures in the compressor entrance region of the engine,
   detecting normal shock total and ambient pressures outside the engine,
   producing signals dependent upon said pressures and combining said signals into the ratio of the total to static pressure of the compressor entrance region and into some predetermined function of this ratio, combining further said signals into the ratio of normal shock total to ambient pressure from outside the engine, and into some predetermined function of this second ratio, and further combining said signals into the ratio of compressor entrance total pressure to ambient pressure from outside the engine, and
   combining said functions and latter pressure ratio in a product relationship employing no independent variables other than the four pressures to obtain signals proportional to ram drag type forces divided by ambient pressure.

References Cited by the Examiner

UNITED STATES PATENTS

| | | | |
|---|---|---|---|
| 2,524,749 | 10/1950 | Baldridge et al. | 73—115 |
| 2,539,616 | 1/1951 | Gehman | 235—179 |
| 2,643,055 | 6/1953 | Sorteberg | 235—61 |
| 2,701,576 | 2/1955 | Higgins | 137—84 |
| 2,740,295 | 4/1956 | Perchonok | 73—357 |
| 2,800,913 | 7/1957 | Swartwont et al. | 137—84 |
| 2,829,828 | 4/1958 | Hollenbach | 235—179 |
| 2,866,332 | 12/1958 | Sherman | 73—116 |
| 2,941,399 | 6/1960 | Bersinger | 73—116 |
| 2,957,622 | 10/1960 | Hulley | 235—61 |
| 2,981,098 | 4/1961 | Antippas et al. | 73—116 |
| 3,038,301 | 6/1962 | Carlson | 60—35.6 |

FOREIGN PATENTS 580,149  8/1946  Great Britain.

LOUIS R. PRINCE, *Primary Examiner.*

C. A. CUTTING, ROBERT L. EVANS, RICHARD QUEISSER, *Examiners.*